(12) United States Patent
Sambangi et al.

(10) Patent No.: US 12,265,729 B1
(45) Date of Patent: Apr. 1, 2025

(54) ENHANCED WRITE BUFFER FLUSH SCHEME FOR MEMORY DEVICES WITH HIGH DENSITY STORAGE MEMORY ARCHITECTURE

(71) Applicant: QUALCOMM Incorporated, San Diego, CA (US)

(72) Inventors: Vamsi Krishna Sambangi, Vizianagaram (IN); Sai Naresh Gajapaka, Hyderabad (IN); Venkatesha M Iyengar, Bengaluru (IN); Madhu Yashwanth Boenapalli, Hyderabad (IN); Sai Praneeth Sreeram, Anantapur (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/413,889

(22) Filed: Jan. 16, 2024

(51) Int. Cl.
*G06F 12/00* (2006.01)
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0656; G06F 3/0604; G06F 3/0659; G06F 3/0679
See application file for complete search history.

(56) References Cited

U.S. PATENT DOCUMENTS

| | | | |
|---|---|---|---|
| 2014/0208001 A1* | 7/2014 | Liu | G06F 12/0868 711/103 |
| 2020/0301612 A1* | 9/2020 | Jin | G06F 3/0659 |
| 2022/0300204 A1* | 9/2022 | Sunata | G06F 3/0659 |
| 2024/0143227 A1* | 5/2024 | Sela | G06F 3/0673 |

* cited by examiner

*Primary Examiner* — Shawn X Gu
*Assistant Examiner* — Mohammad S Hasan
(74) *Attorney, Agent, or Firm* — NORTON ROSE FULBRIGHT US LLP/Qualcomm

(57) ABSTRACT

This disclosure provides systems, methods, and devices for memory systems that support enhanced write buffer flush schemes. In a first aspect, a method performed by a memory controller includes detecting, by the memory controller, a flush operation associated with a write buffer. The method also includes detecting, by the memory controller during the flush operation, a command for placement into a command queue. The method further include prioritizing, by the memory controller, the flush operation to by placing the command in a wait queue and maintaining the flush operation. Other aspects and features are also claimed and described.

30 Claims, 11 Drawing Sheets

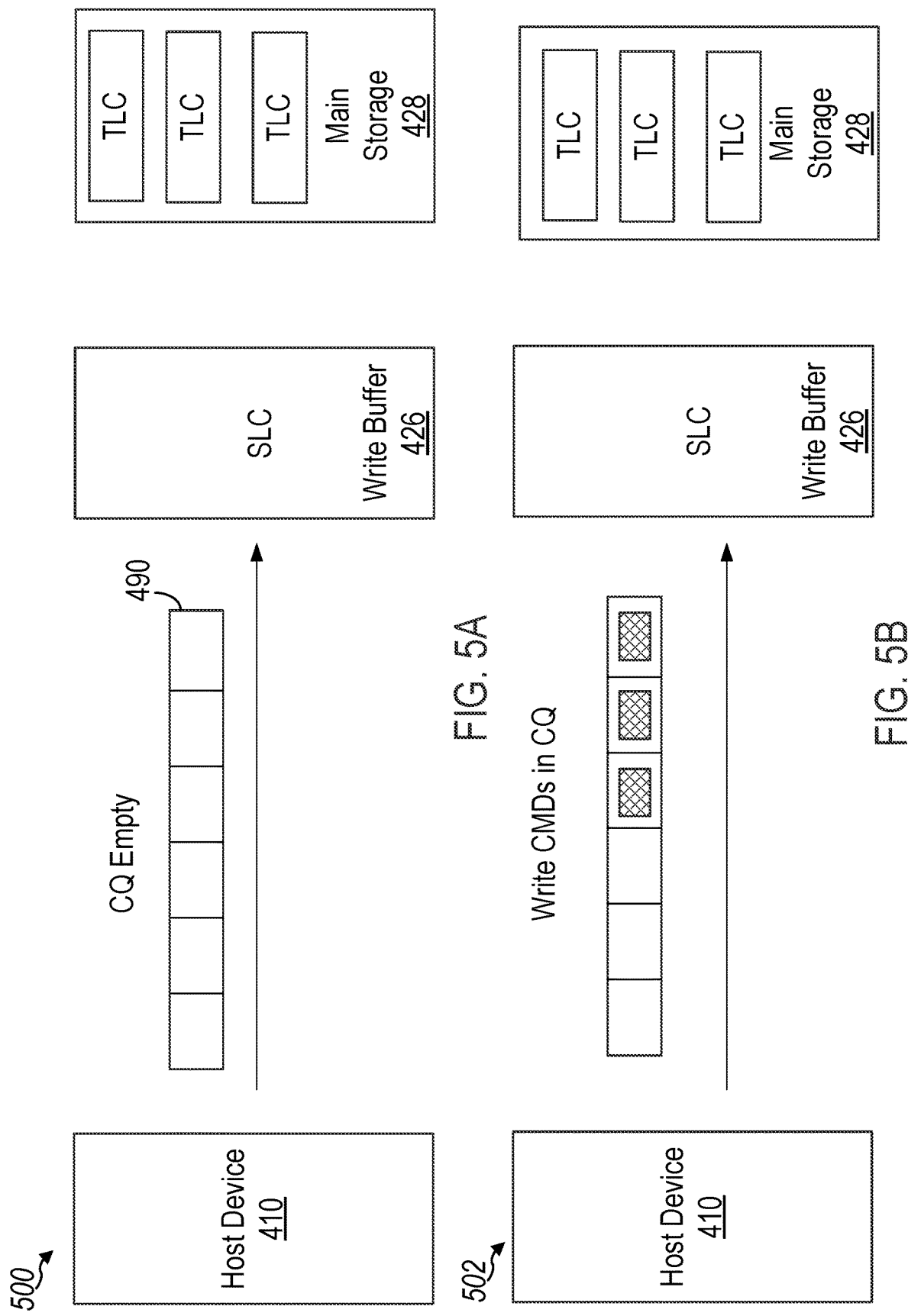

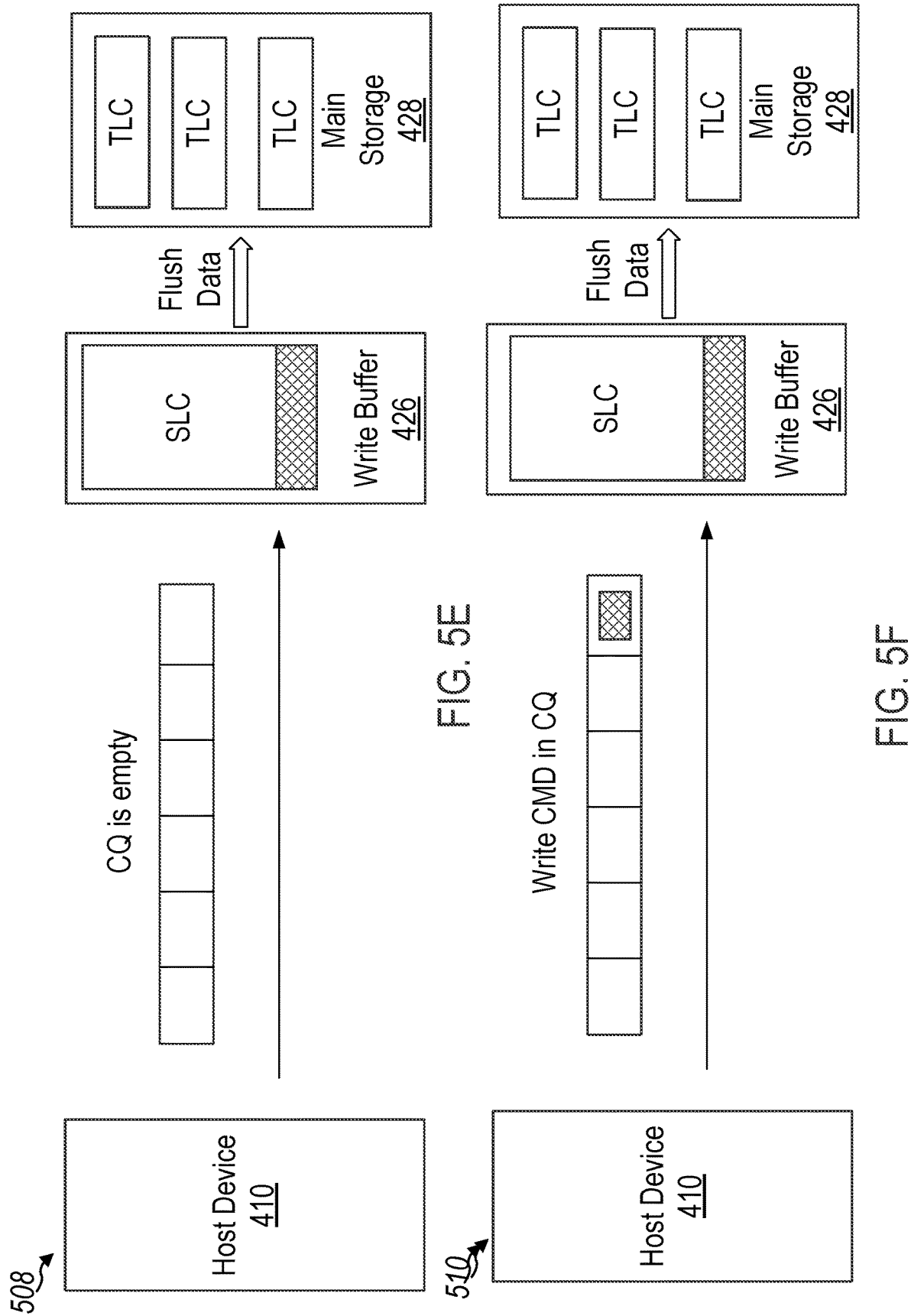

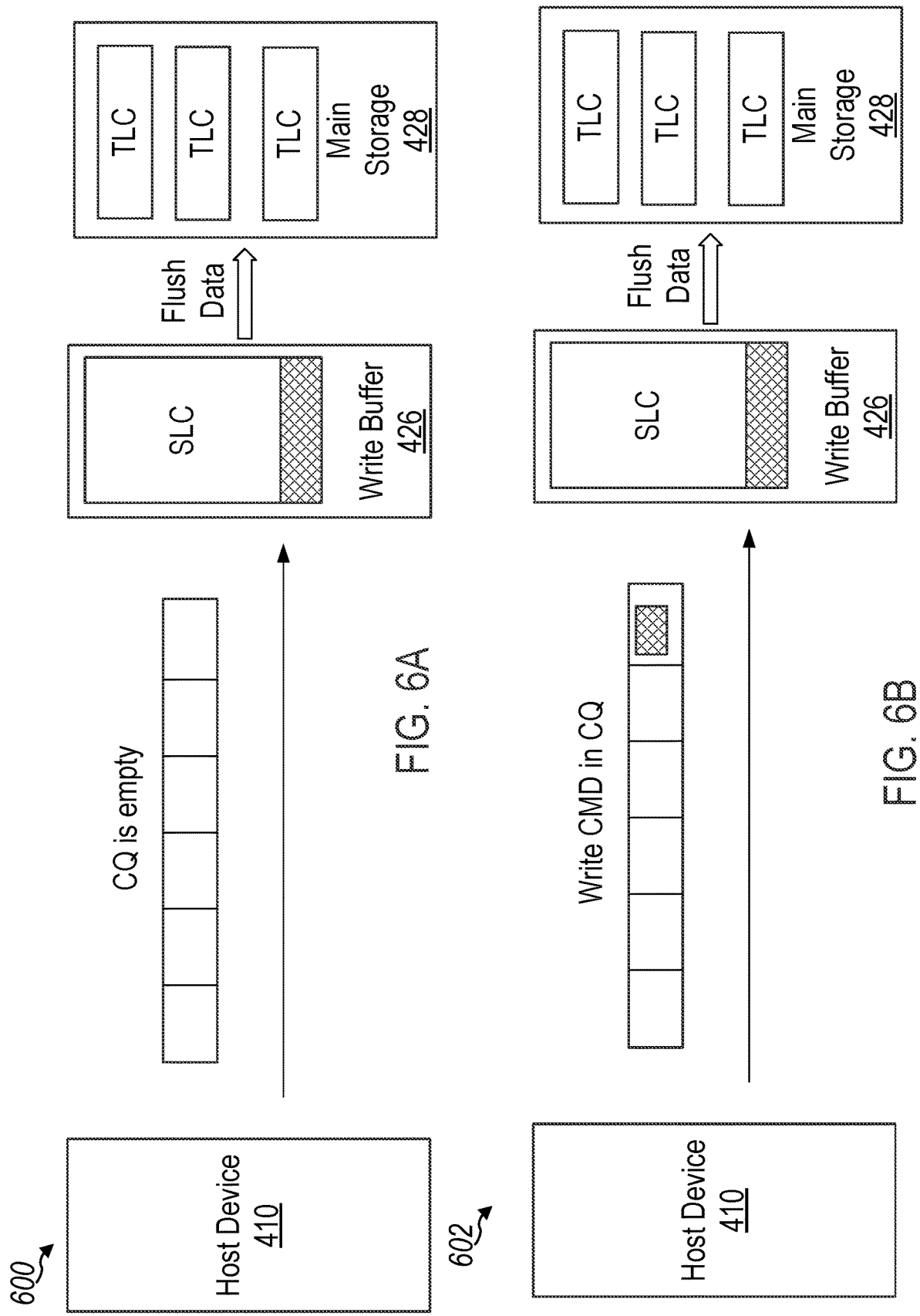

ENHANCED WRITE BUFFER FLUSH SCHEME FOR MEMORY DEVICES WITH HIGH DENSITY STORAGE MEMORY ARCHITECTURE

TECHNICAL FIELD

Aspects of the present disclosure relate generally to an apparatus and method for controlling a memory device. Some aspects may, more particularly, relate to an apparatus and method for controlling operations of a memory device to support prioritized write buffer flush functionality that improves throughput of write operations to memory architectures capable of storing multiple bits per memory cell.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

A memory system may, in some cases, be integrated with or otherwise connected to a host device, such as an electronic device. For example, memory systems may be integrated with host devices in a system on chip (SoC). As one particular example, a flash memory system, which may be a universal flash storage (UFS) memory system, may be integrated into an electronic device, such as an access point (AP), station (STA), user equipment (UE), base station, modem, camera, automobile, or other system.

Flash memory systems, such as a UFS memory systems, provide improved storage capabilities with fast access times, resulting in the proliferation of flash memories in a variety of devices. Such flash memory systems may store data in memory regions having different memory architectures. For example, flash memory systems may implement a single-level cell (SLC) memory architecture in which each memory cell is capable of storing a single bit of data, or high density storage memory architectures capable of storing multiple bits per memory cell, such as a multi-level cell (MLC) memory architecture capable of storing two bits of data per memory cell or a triple-level cell (TLC) memory architecture capable of storing three bits of data per memory cell. Although MLC and TLC memory architectures may support higher storage density by allowing more data to be stored in the same physical space as compared to SLC memory architectures, the SLC memory architectures may have faster write and erase speeds, higher endurance, and better reliability than the MLC and TLC memory architectures.

To improve the throughput of a memory system that includes a main storage having a MLC or TLC memory architecture, the memory system may include a write buffer having a SLC memory architecture. The write buffer temporarily stores data before the data is written to the main storage, allowing for faster write operations, particularly when a memory controller is to perform write operations at random locations in the main storage and the write buffer has sufficient available memory space to temporarily store the data for writing. Periodically, the write buffer may need to be flushed or purged of data for various reasons, such as when the data is all written to the main storage, when a write command is canceled, when the memory system changes states, etc. A flushing operation, the write buffer flush, may include transferring (e.g., writing) all of the data in the write buffer to the main storage and unmaping the write buffer (e.g., indicating the data as available to be written).

According to some memory system standards, UFS 4.0, a device may execute the write buffer flush operation only when the command queue is empty. If the device receives a command in the command queue while flushing the write buffer, the device suspends the flush operation to expedite the processing of that command. When processing a write command during a suspended flush operation, the data is written directly to the main storage, and TLCs thereof, which reduces write throughput.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects disclosed herein describe memory systems, such as flash memory devices, that support enhanced write buffer flush schemes for writing data from a write buffer to main storage having a higher storage density. In aspects, a memory device may include a write buffer that includes a single-level cell (SLC) memory architecture and main storage having a higher storage density, such as a multi-level cell (MLC) memory architecture or a triple-level cell (TLC) architecture. A memory controller may be configured to prioritize write buffer flush operations over commands to be placed in a command queue under some scenarios. The memory controller and/or host may evaluate one or more write buffer flush prioritization conditions to determine when to prioritize a flush operation over the commands in or to be placed in the command queue. For example, the memory controller may prioritize flush operations when the write buffer is not as full and/or when the commands are really large, as finishing the flush operation and then writing data to the buffer and then to main storage will produce less system latency or take less time as compared to pausing the flush operation and writing the data directly to the main storage using the higher latency of the TLC architecture. In some implementations, the memory controller may place or cause incoming commands during a flush operation to be placed in a separate wait queue and may finish the flush operation before execution the commands. In other implementations, the memory controller may ignore or deprioritize commands in the command queue (or execution queue) and not suspend the flush operation. To prioritize the flush operation, the memory controller may finish writing or purging data from the write buffer, before executing the command. When the command is a write command, the memory controller may write data to write buffer and then to the main storage as in normal operation, rather then writing data directly to the main storage when the write buffer is undergoing an in process flush. In this manner, the prioritized write buffer flush scheme described herein may improve overall throughput and reduce latency by reducing the likelihood that data will be written directly to the main storage with reduce throughput.

In one aspect of the disclosure, an apparatus, such as wireless communication device, includes a memory controller coupled to a write buffer and configured to access data stored at the write buffer. The write buffer has a SLC memory architecture. The memory controller is also coupled to a memory module through a first channel and configured to access data stored in the memory module through the first channel. The memory module has a higher storage density memory architecture than the write buffer. The memory controller is further coupled to a host device through a first interface and configured to communicate with the host device over the first interface. The memory controller is configured to cause the apparatus to: detect a flush operation associated with the write buffer; detect, during the flush operation, a command for placement into a command queue associated with the host device; and prioritize the flush operation by causing the host device to place the command in a wait queue and maintaining the flush operation. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

In an additional aspect of the disclosure, an apparatus, such as wireless communication device, includes a host device coupled to a memory controller through a first interface and configured to communicate with the memory controller over the first interface, the host device configured to cause the apparatus to: detect a flush operation associated with a write buffer; detect, during the flush operation, a command for placement into a command queue; and prioritize the flush operation by placing the command in a wait queue and not interrupting the flush operation. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A-5G illustrate example operations of an example of a write buffer flush scheme according to some embodiments of the disclosure.

FIGS. 6A-6C illustrate example operations of an example of a prioritized write buffer flush scheme according to some embodiments of the disclosure.

Like reference numbers and designations in the various drawings indicate like elements.

DETAILED DESCRIPTION

Figure 1:
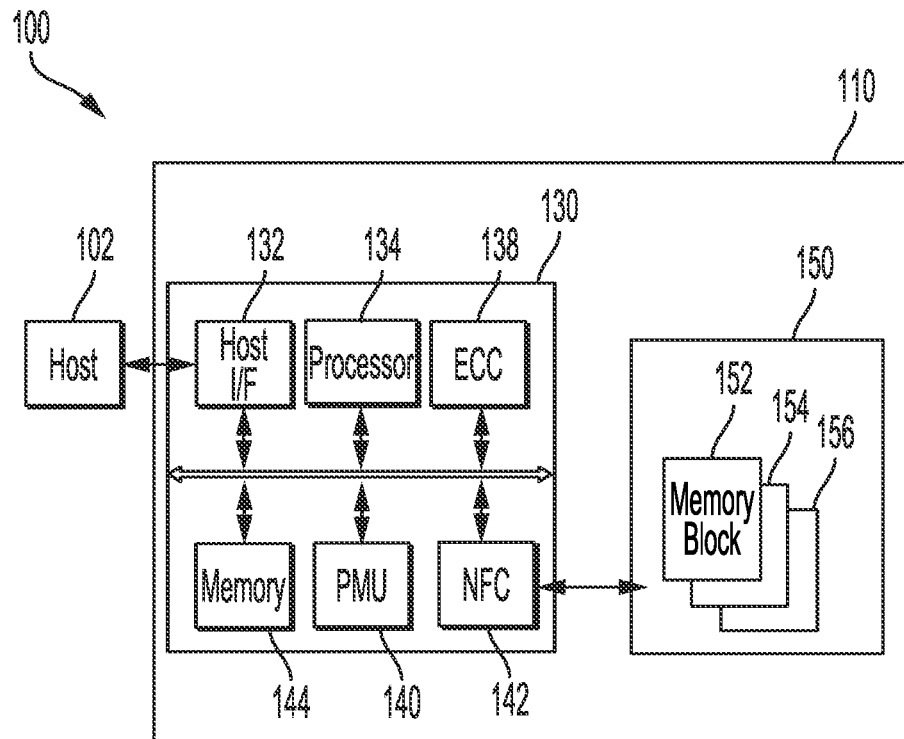
FIG. 1 is a block diagram illustrating a data processing system including a memory system in accordance with an embodiment of the present invention.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for storing, retrieving, and organizing data in a memory system. Aspects of this disclosure provide for operations and data structures used in those operations for enhanced write buffer flush schemes for writing data from a write buffer of a memory system to main storage having a higher storage density than the write buffer. For example, a memory device may include a write buffer that includes a single-level cell (SLC) memory architecture and main storage having a higher storage density, such as a multi-level cell (MLC) memory architecture or a triple-level cell (TLC) architecture. Although such higher density main storage may be able to store additional data in less physical area, write operations may be slower than for less dense memory architectures, and thus a write buffer may improve overall throughput for writing data to the main storage.

A memory controller of the memory system may be configured to maintain a list of data segments stored in the write buffer and the corresponding amount of potential available contiguous memory space if the respective data segment is cleared from the write buffer. The memory controller may sort the list in descending order of available contiguous memory space and, when the memory controller identifies a flush opportunity, the memory controller may initiate a flush operation for the data segment at the front of the list (e.g., a data segment that, when flushed, will free up the most contiguous memory space in the write buffer). After the data segment is flushed from the write buffer to the main storage, the memory controller may delete the entry at the front of the list, such that the entry associated with the next largest available contiguous memory space moves to the front of the list. When a new data segment is written to the write buffer, the memory controller may add an entry to the list based on the new data segment and a corresponding amount of potential available contiguous memory space associated with flushing the new data segment, and the list may be resorted based on the amount of contiguous memory space of the entries.

In some implementations, if a write command is received by the memory controller prior to completion of the flush operation for a data segment, the flush operation is paused and the write command is performed and the list updated based on the new data segment and resorted. After completion of the write command, the flush operation is continued to flush a remainder of the data segment, and the list is updated to delete the entry corresponding to the flushed data segment. Additional flush operations are held until completion of the paused flush operation, thereby enabling flushing data segments in sorted order.

Particular implementations of the subject matter described in this disclosure may be implemented to realize one or more of the following potential advantages or benefits. In some aspects, the present disclosure provides techniques for improved performance of a memory system, such as improved throughput of writing to the memory system, including to a main storage portion of the memory system that is capable of storing multiple bits of data per cell. Such improved throughput may be achieved by leveraging a write buffer (e.g., a Turbo Write Buffer) that includes a single-level cell (SLC) memory architecture and an enhanced write buffer flush scheme for the write buffer. For example, the write buffer may be configured to cache entries to be written to the higher-density main storage, and entries from the write buffer may be flushed to the main storage based on a list maintained by the memory controller. Instead of flushing entries according to a first in, first out (FIFO) scheme, the memory controller may sort the list of entries in the write buffer based on the amount of contiguous memory space that is freed up by clearing the respective data segment. In this manner, the write buffer flush scheme described herein may optimize the amount of potential available contiguous memory space in the write buffer after each flush operation. For example, each time a flush operation is performed, the maximum possible amount of contiguous storage in the write buffer is achieved, which reduces the likelihood that a new data segment will not fit in the write buffer and thus be written directly to the main storage. Reducing the amount of write operations performed directly to main storage improves the throughput of the memory system, particularly as the data stored in the write buffer becomes more fragmented during operation of the memory system.

Memory may be used in a computing system organized as illustrated in FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 4.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as memory blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (PoP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host IF unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host IF unit 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU), or an application-specific integrated circuit (ASIC).

Figure 2:
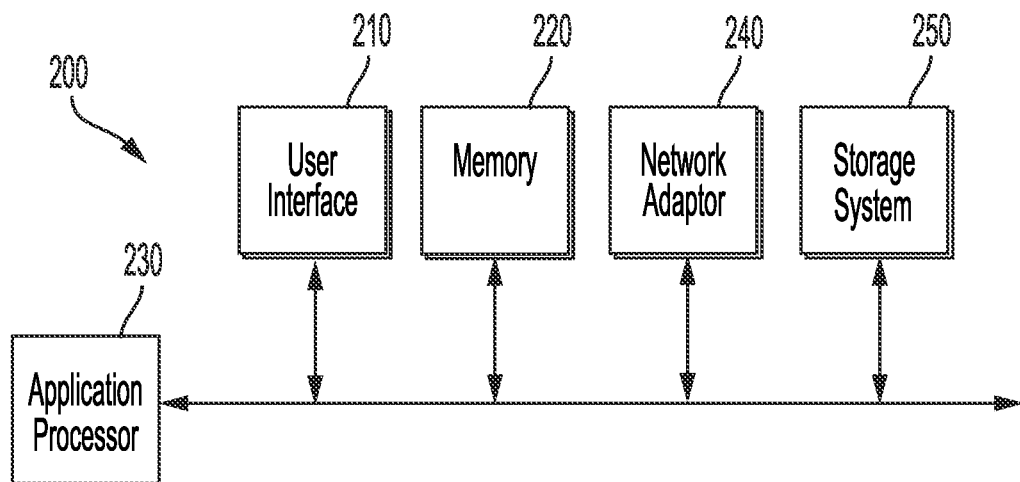
FIG. 2 is a block diagram illustrating an example electronic device including the memory system according to one or more aspects of the disclosure.

FIG. 2 is a block diagram illustrating an example electronic device including the data processing system 100 according to one or more aspects of the disclosure. The electronic device 200 may include a user interface 210, a memory 220, an application processor 230, a network adaptor 240, and a storage system 250 (which may be one embodiment of the data processing system 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMO-LED) display device, a light emitting diode (LED), a speaker, or a haptic motor.

Figure 3:
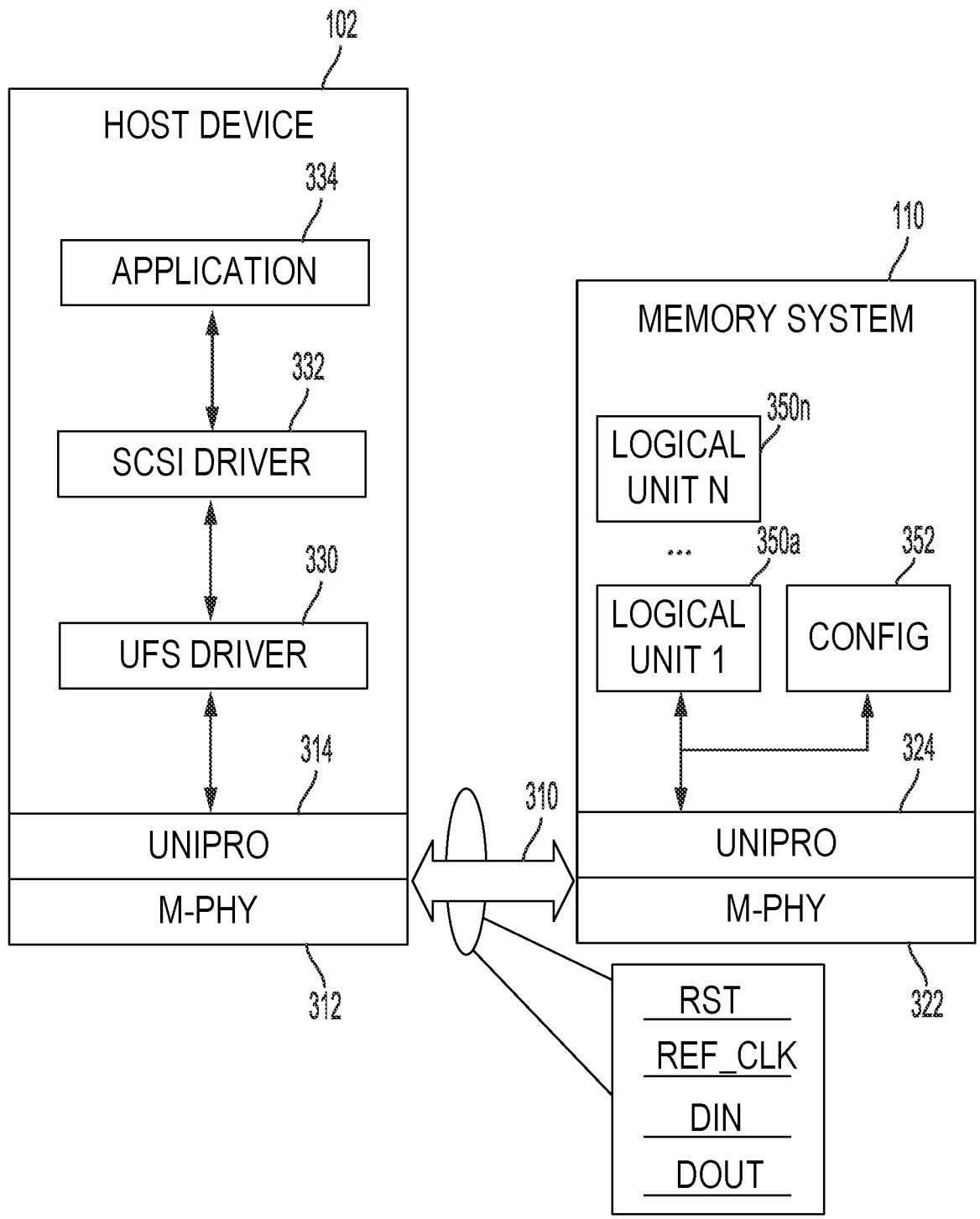
FIG. 3 is a block diagram illustrating components for facilitating access to a flash memory device from a host device according to some embodiments of the disclosure.

FIG. 3 is a block diagram illustrating components for facilitating access to a flash memory system from a host device according to some embodiments of the disclosure. The host device 102 accesses the memory system 110 through a memory interface 310 (e.g., a first interface). The first interface may, for example, be a memory interface such as a physical interface (PHY) connecting the host device 102 to the memory system 110. The host device 102 may include physical layer access block 312, which is configured to generate signals for output to the memory interface 310 and process signals received through the memory interface 310. The memory system 110 includes a similarly-configured physical layer access block 322 for communicating on the memory interface 310. One example physical layer specification for communicating on the memory interface 310 is the MIPI M-PHY™ physical layer specification.

The host device 102 also includes a data link layer block 314 configured to format frames of data for transmission on the memory interface 310. The frames may be provided to the physical layer access block 312 for transmission. The data link layer block 314 may receive frames from the physical layer access block 312 and decode frames of data received on the memory interface 310. The memory system 110 includes a similarly-configured data link layer block 324 for processing frames transmitted on or received on the memory interface 310 by the physical layer access block 322. One example data link protocol for communicating on a MIPI M-PHY™ physical link is the MIPI UNIPRO™ specification.

The memory system 110 includes N logical units 350a-n comprising logical memory blocks for storing information including user data (e.g., user documents, application data) and configuration data (e.g., information regarding operation of the memory system 110). The logical units 350a-n may map to portions of the physical memory blocks 152, 154, and 156. Some of the logical units 350a-n or portions of the logical units 350a-n may be configured with write protection, with boot capability, as a specific memory type (e.g., default, system code, non-persistent, enhanced), with priority access, or with replay protection as a replay protected memory block (RPMB). The physical layer access block 322 and the data link layer block 324 perform operations of a memory controller for the memory system 110 for storing and retrieving data in logical units 350a-n.

The memory system 110 also includes configuration structures 352. The configuration structures 352 may include information such as configuration descriptors for boot enable (bBootEnable), initial power mode (bInitPowerMode), RPMB active (bRPMBRegionEnable), and/or RPMB region sizes (bRPMBRegion1Size, bRPMBRegion2Size, bRPMBRegion3Size). Such configuration structures and/or parameters may, for example, be configuration structures and/or parameters identified by the UFS standard.

The host device 102 may be configured to execute one or more applications 334, such as user applications executed by an operating system under the control of a user to receive user input and provide information stored in the memory system 110 to the user. The host device 102 may include several components for interfacing the application 334 to the memory system 110 through the memory interface 310. For example, a SCSI driver 332 and a UFS driver 330 may interface the application 334 to a host memory controller that includes the data link layer block 314 and the physical layer access block 312. The SCSI driver 332 may execute at an application layer for handling transactions requested by the application 334 with the memory system 110. The UFS driver 330 may execute at a transport layer and manage operation of the data link layer block 314, such as to operate the memory interface 310 at one of a plurality of modes of operations. The modes of operations may include two or more gear settings, such as one or more PWM-GEAR settings and four or more HS-GEAR settings specifying one bitrate from 182 MBps, 364 MBps, 728 MBps, and 1457 MBps.

The memory interface 310 may include one or more lines including a reset RST line, a reference clock REF_CLK line, a data-in DIN line (for data transmissions from the host device 102 to the memory system 110), and a data-out DOUT line (for data transmissions from the memory system 110 to the host device 102). The DIN and DOUT lines may be two separate conductors, or the DIN and DOUT lines may include multiple conductors. In some embodiments, the DIN and DOUT lines may be asymmetric with the DIN line including N conductors and the DOUT line including M conductors, with N>M or M>N.

The UFS driver 330 may generate and decode packets to carry out transactions requested by the application 334. The packets are transmitted over the memory interface 310. The packets may be formatted as UFS Protocol Information Units (UPIUs). In a transaction with the memory system 110, the host device 102 is an initiator and the memory system 110 is a target. The UFS driver 330, based on the type of transaction, may form one of several types of UPIUs for handling SCSI commands, data operations, task management operations, and/or query operations. Each transaction may include one command UPIU, zero or more DATA IN or DATA OUT UPIUs, and a response UPIU. Each UPIU may include a header followed by optional fields depending on the type of UPIU.

One example transaction is a read operation. A read transaction may include the initiator (e.g., host device 102) transmitting a command UPIU for causing the target (e.g., memory system 110) to perform a read operation requested by the application 334. The target provides one or more DATA IN UPIUs in response to the command UPIU, in which the DATA IN UPIUs include the requested data. The read transaction is completed by the target transmitting a Response UPIU.

Another example transaction is a write operation. A write operation may include the initiator (e.g., host device 102) transmitting a command UPIU for causing the target (e.g., memory system 110) to perform a write operation requested by the application 334. The target provides a Ready to Transfer UPIU signaling the initiator to begin transfer of write data. The initiator then transmits one or more DATA OUT UPIUs, which are followed by a Ready to Transfer UPIU signaling the initiator to continue transfer of the write data. The sequence of DATA OUT UPIUs and Ready to Transfer UPIU continues until all write data is provided to the target, after which the target provides a Response UPIU to the initiator.

A further example transaction is a query operation. A query operation may include the initiator (e.g., host device 102) requesting information about the target (e.g., memory system 110). The initiator may transmit a Query Request UPIU to request information such as configuration, enumeration, device descriptor, flags, and/or attributes of the target. Example query operations includes read descriptor, write descriptor, read attribute, write attribute, read flag, set flag, clear flag, and/or toggle flag. Example descriptors include device, configuration, unit, interconnect, string, geometry, power, and/or device health. Example flags include fDeviceInit, fPermanenetWPEn, fPowerOnWPEn, fBackgroundOpsEn, fDeviceLifeSpanModeEn, fPurgeEnable, fRefreshEnable, fPhyResourceRemoval, fBusyRTC, and/or fPermanentlyDisableFwUpdate. Example attributes include bBootLunEn, bCurrentPowerMode, bActiveICCLevel, bOutOfORderDataEn, bBackgroundOpStatus, bPurgeStatus, bMaxDataInSize, bMaxDataOutSize, dDynCapNeeded, bRefClkFreq. Such flags may, for example, be flags identified by the UFS standard.

Figure 4:
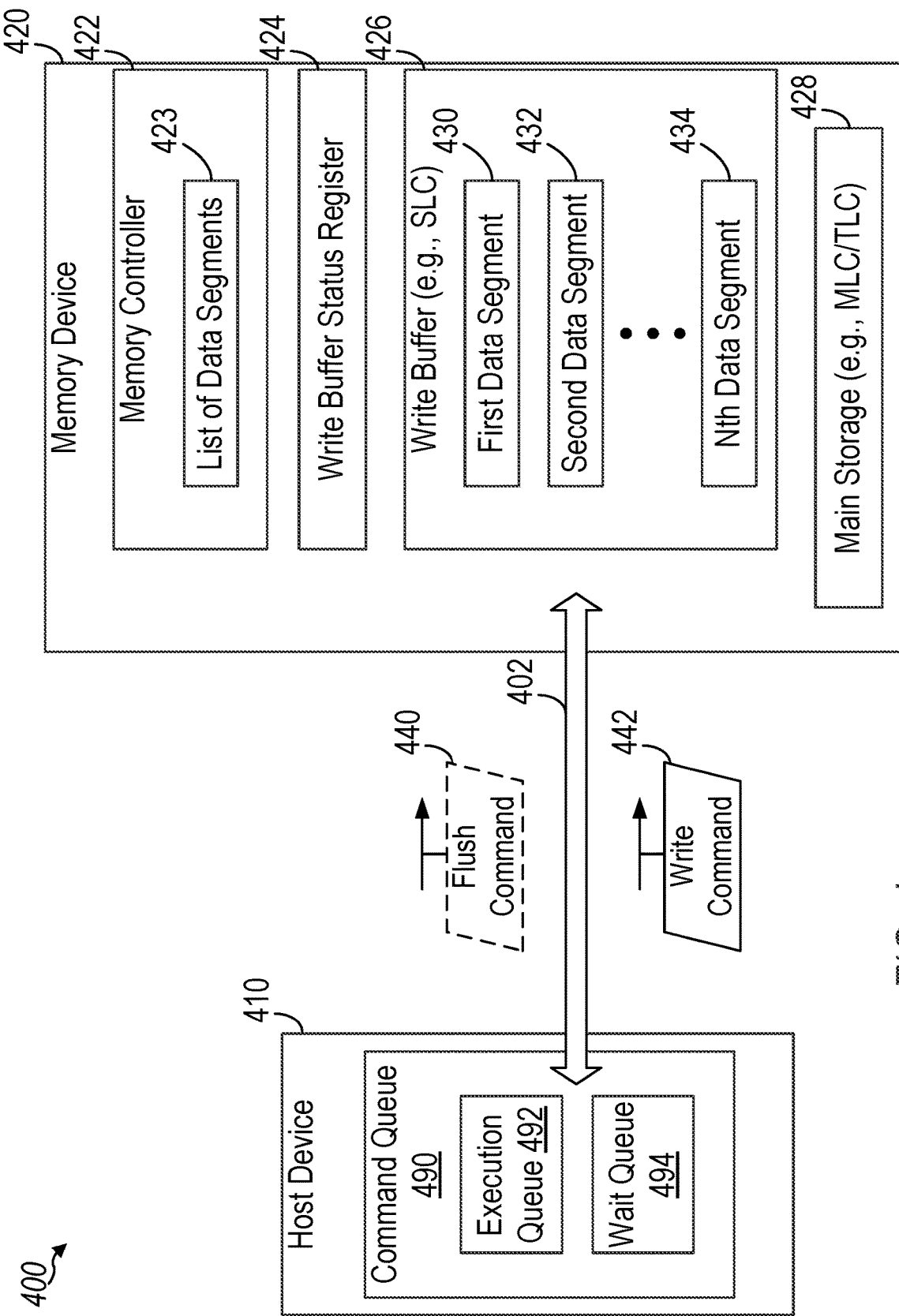
FIG. 4 is a block diagram illustrating an example of a memory system that supports an enhanced prioritized write buffer flush scheme for writing data to main storage capable of storing multiple bits of data per cell according to some embodiments of the disclosure.

The operations and capabilities described above may be used for a memory system that supports an enhanced write buffer scheme that improves throughput of memory devices that include high density main storage capable of storing multiple bits of data per memory cell. Referring to FIG. 4, a block diagram of an example of a memory system that supports prioritizing write buffer flush operations for writing data to main storage capable of storing multiple bits of data per cell according to some embodiments of the disclosure is shown as memory system 400. Memory system 400 may include or correspond to data processing system 100 of FIG. 1, electronic device 200 (or portions thereof), host device 102 and memory system 110 of FIG. 3 (or components thereof), or a combination thereof. Memory system 400 may be a flash memory system configured to operate according to a UFS standard (e.g., memory device 420 may be configured as a UFS device). Memory system 400 includes a host device 410 coupled to a memory device 420 by an interface 402.

Although host device 410 and memory device 420 are shown as distinct components in the example of FIG. 4, in other implementations, memory device 420 may be included in or integrated within host device 410. For example, host device 410 may include or correspond to a user equipment (UE), a computing device, a desktop computing device, a laptop computing device, a tablet computing device, a mobile phone, a smart phone, a media playback device, a gaming device, an augmented reality (AR) device, a virtual reality (VR) device, an extended reality (XR) device, an internet of things (IoT) device, a smart device, a vehicular device or module, or a combination thereof, and memory device 420 may include or correspond to components of host device 410.

Host device 410 includes one or more queues, such as a queue or queues for or associated with the memory device 420. As illustrated in FIG. 4, the host device 410 includes a command queue 490 for the write buffer 426 and main storage 428 of the memory device 420. The host device 410 may include multiple command queues for the memory device 420, such as one for each memory module thereof.

The command queue 490 may be configured to store commands for or for execution by the memory device 420, such as read commands, write commands, status change commands, etc. Placement of commands in the command queue 490 by the host device 410 may cause the memory device 420 to wake up if hibernating and/or to pause a flush operation if a flush operation is in process.

The command queue 490 itself may include one or more queues in some implementations. As illustrated in the example of FIG. 4, the command queue 490 include an execution queue 492 and a wait queue 494. The execution queue 492 may be configured to store commands for the memory device 420 while the memory device 420 is not busy or hibernating, such as while the memory device 420 is not performing a flush operation or not prioritizing the flush operation. The wait queue 494 may be configured to store commands for the memory device 420 while the memory device 420 is busy or hibernating, such as while the memory device 420 is performing a flush operation or prioritizing the flush operation.

As compared to conventional memory systems 400 which include a command queue, utilizing the wait queue 494, such as bifurcating the command queue 490 into the execution queue 492 and wait queue 494, for commands may enable the memory device 420 to prioritize flushing operations in some scenarios, such as when the write buffer 426 is less full and finishing the flush operation and utilizing the write buffer 426, with its lower latency cells (e.g., SLCs), for new commands would improve performance overall, such as with reduced overall latency. This bifurcation of the command queue or distinction between execution and wait queues may enable device to prioritize flush operations over commands without an architecture redesign or minimal software changes. Additionally, such may be compatible with memory standards such as UFS 4.0, which is designed to interrupt flush operations when commands are present in a command queue.

Although the execution queue 492 and wait queue 494 are shown as distinct components in the command queue 490, each of the execution queue 492 and wait queue 494 may be logical or virtual queues which correspond to the same physical components or logic of the command queue 490. Alternatively, the wait queue 494 may be separate from the command queue 490 and may correspond to different physical components or logic from the command queue 490. In some such implementation, the command queue 490 may not include a separate execution queue, and the command queue 490 may include or correspond to an execution queue, such as a command execution queue. Additionally, or alternatively, although the command queue 490 is illustrated as being part of the host device 410, in some implementations, the command queue 490 is part of the memory device 420.

Memory device 420 may include a variety of components (such as structural, hardware components) used for carrying out one or more functions described herein. For example, these components may include memory controller 422, write buffer status register 424, write buffer 426, and main storage 428. Memory controller 422 may include one or more processors, microprocessors, or other hardware components that are configured to perform operations described herein for facilitating communications between host device 410 and memory device 420, and for accessing data at, and writing data to, write buffer 426 and main storage 428. Memory controller 422 may execute one or more instructions stored in memory to perform the operations described herein, and memory controller 422 may store information and data obtained during operation in one or more registers at memory device 420. For example, memory controller 422 may be configured to implement one or more registers, such as write buffer status register 424, which is configured to store status information related to write buffer 426. To illustrate, the write buffer status register 424 may indicate whether the write buffer is full, performing a flush operation, prioritizing a flush operation, etc.

As another example, the memory controller 422 may be configured to determine whether to prioritize a write buffer flush operation. For example, the memory controller 422 may perform one or more determinations to determine whether a write buffer flush operation should be prioritized over incoming or received commands, such as write command 442, a read command, etc.

Additionally, the memory controller 422 may be configured to implement or prioritize the write buffer flush operation. For example, the memory controller 422 may communicate with the host device 410 to prioritize a flush operation, including to inform the host device 410 of a status of the flush operation, if the flush operation is being prioritized, etc. As another example, the memory controller 422 may enable prioritization of the flush operation or prioritize the flush operation by placing (e.g., by causing the host device 410 to place) received commands, such as write command 442, in a wait queue 494 or moving commands in the command queue 490 to the wait queue 494 (e.g., from the execution queue 492 to the wait queue 494).

Memory device 420 may be configured to store data for use by host device 410, such as at write buffer 426, main storage 428, or both. Write buffer 426 may include a portion of storage cells of memory device 420 that are configured to store one bit of data per storage cell, and main storage 428 may include a portion of storage cells (e.g., a memory module) of memory device 420 that are configured to store multiple bits of data per storage cell. As such, main storage 428 may be referred to as having a higher storage density than write buffer 426. For example, write buffer 426 may include a single-level cell (SLC) memory architecture, and main storage 428 may include a multi-level cell (MLC) memory architecture (e.g., each storage cell may be configured to store two bits of data) or a triple-level cell (TLC) memory architecture (e.g., each storage cell may be configured to store three bits of data), as non-limiting examples. In other implementations, the memory architecture of main storage 428 may be configured to store more than three bits of data per storage cell. Because write buffer 426 has a SLC memory architecture, write buffer 426 may provide faster write and erase speeds, higher endurance, and better reliability than main storage 428, although main storage 428 may provide higher storage density than write buffer 426. In some implementations, write buffer 426 is configured to implement a WriteBooster feature that enhances the write performance of NAND memory by acting as a dedicated buffer that temporarily stores data before being written to main storage 428, allowing for faster write operations. The WriteBooster feature can be configured in different ways, including the type of buffer (e.g., lookup (LU)-based or shared), buffer size, and user space reduction mode.

During operation of memory system 400, memory controller 422 may maintain list 423 of data segments stored in write buffer 426. List 423 may include, for each entry, a data segment identifier of a respective data segment stored at write buffer 426 and an amount of available contiguous memory space in write buffer 426 if the data segment is flushed (e.g., removed). For example, write buffer 426 may store a first data segment 430, a second data segment 432, and an Nth data segment 434, and list 423 may include entries that correspond to each of data segments 430, 432, and 434. In such an example, an entry of list 423 that corresponds to first data segment 430 includes an identifier that is associated with first data segment 430 and an amount of available contiguous memory space in write buffer 426 if first data segment 430 is cleared from write buffer 426 (also referred to as a "potential available contiguous memory space"). List 423 may include similar entries for second data segment 432 and Nth data segment 434. Although three data segments are shown as being stored in write buffer 426 in FIG. 4, in other implementations, write buffer 426 may store fewer than three or more than three data segments (e.g., N may be fewer than three or greater than three).

In addition to maintaining list 423, memory controller 422 may monitor to detect a flush opportunity associated with write buffer 426. Memory controller 422 may be configured to detect a flush opportunity based on a command from host device 410 or based on a status of interface 402. For example, memory controller 422 may detect a flush opportunity by detecting a flush command 440 sent from host device 410 to memory device 420 via interface 402. In some implementations, in accordance with a memory standard such as a UFS standard, memory device 420 may inform host device 410 when a WriteBooster buffer (e.g., write buffer 426) is full or near full using an exception event, and host device 410 may send flush command 440 based on receiving the exception event. As another example, memory controller 422 may detect a flush opportunity by detecting a connection to host device 410 via interface 402 is dormant. Dormancy of interface 402 may be detected if a time period in which no communication is performed between host device 410 and memory device 420 via interface 402 satisfies a threshold, if an idle signal is detected via interface 402, if a standby command is received from host device 410, if a detected energy level associated with interface 402 falls below a threshold, or in any other manner of detecting that interface 402 between host device 410 and memory device 420 has become dormant.

Based on detection of the flush opportunity, memory controller 422 may initiate a flush operation to write a data segment from write buffer 426 to main storage 428. The data segment that is flushed corresponds to a first entry of list 423. For example, if the first entry of list 423 (e.g., after being sorted) includes an identifier of second data segment 432, memory controller 422 may initiate a flush operation to write second data segment 432 from write buffer 426 to main storage 428. If the flush operation is performed to completion without being interrupted by another operation (as further described below), memory controller 422 may delete second data segment 432 from write buffer 426. For example, if memory controller 422 receives an indication from main storage 428 that second data segment 432 has been successfully stored at main storage 428, memory controller 422 may delete second data segment 432, such as by erasing the data segment or otherwise marking that the memory space that previously stored second data segment 432 is now available to store new data (often referred to as unmapping). After deleting second data segment 432 from write buffer 426, memory controller 422 may update list 423 to delete the first entry (e.g., the entry that is associated with second data segment 432), and re-sort list 423 such that a second entry of list 423 is now be located at the front of list 423.

If memory controller 422 receives a write command to store new data in write buffer 426 after performance of the flush operation, the intervening memory space between first data segment 430 and second data segment 432, the space in which second data segment 432 was previously stored, and the intervening space between second data segment 432 and Nth data segment 434 may be available for storing the new data, in addition to any other available memory space in write buffer 426. Memory device 420 may receive a write command 442 from host device 410, and memory controller 422 may write a new data segment indicated by or included in write command 442 to write buffer 426.

After the new data segment is written to write buffer 426, memory controller 422 may add a new entry associated with the new data segment to list 423 and, after the new entry is added, memory controller 422 may update one or more entries of list 423 based on changes to the respective available contiguous memory space of some entries caused by adding the new data segment to write buffer 426.

However, if another command is received during performance of the flush operation, memory controller 422 may pause performance of the flush operation to perform the newly received command, such as if the command has higher priority or is placed in the command queue 490. For example, if memory device 420 receives write command 442 from host device 410 during performance of the flush operation associated with second data segment 432, memory controller 422 may pause performance of the flush command, resulting in a portion of second data segment 432 being stored at main storage 428 and a remainder of second data segment 432 still being stored at write buffer 426. An example of operations for receipt of a command during a flushing operation are illustrated and described further with reference to FIGS. 5A-5G.

After pausing the performance of the flush operation, memory controller 422 may perform a write operation to write a new data segment indicated by write command 442 directly to main storage 428. However, as described above, the multiple-level cells (e.g., TLCs) of the main storage 428 have reduced write throughput and execution of the write command 442 may actually take longer than completing the flush operation and then writing the data to the write buffer 426 in some scenarios, such as when the write buffer is below a threshold amount of data or the write command 442 or commands are large and/or numerous.

In such scenarios, the memory controller 422 may determine to prioritize a flush operation over one or more commands received during a flushing operation, such as write command 442. For example, if memory device 420 receives write command 442 from host device 410 during performance of the flush operation, memory controller 422 may place or cause the write command 442 to be placed in the wait queue 494. To illustrate, the memory controller 422 may determine to place the command in the wait queue 494 based on the type of command and/or based on one or more conditions. As an illustrative example, the memory controller 422 may determine to prioritize the flush operation based on the amount of data in the write buffer 426 being below a threshold amount or a threshold percentage of data of the write buffer 426 of the total space or size of the write buffer 426.

In some implementations, the host device 410 may determine to prioritize the flush operation, alone or in combination with the memory controller 422. For example, the host device 410 may determine to prioritize the flush operation based on a number of commands, an amount of data associated with the commands, or a combination thereof. Examples of write buffer flush prioritization operations are described further with reference to FIGS. 6A-6C and FIG. 7.

In some implementations, the status of write buffer 426 with respect to performance of flush operations (or other operations) is provided by a value stored in write buffer status register 424. For example, one or more bits of write buffer status register 424 may indicate a type of flush operation that is being performed at write buffer 426. The type of flush operation may include a standard flush operation (e.g., a FIFO or time-based flush operation), a partial flush operation (e.g., a flush operation that has been paused or interrupted by a write operation), or an available contiguous memory space-based flush operation (e.g., a flush operation in accordance with list 423). In some implementations, in accordance with a memory standard such as a UFS standard, write buffer status register 424 may store an eight bit numerical value, of which four bits indicate the status of a flush operation with respect to write buffer 426 (e.g., that there no flush has been initiated, that a flush operation is in progress, that a flush operation was stopped prematurely, that a flush operation was completed successfully, or a flush operation general failure), and two bits indicate what type of flush operation is being performed: the standard flush operation (e.g., a traditional flush operation), the partial flush operation, or the available contiguous memory-space based flush operation (e.g., a selective flush operation). In some such implementations, the four least significant bits of the value in write buffer status register 424 may be used to indicate the status of write buffer 426 and the next two least significant bits of the value may be used to indicate the type of flush operation. In other operations, the eight bits may be allocated differently, or the write buffer status register 424 may store fewer than eight bit values or greater than eight bit values. When memory controller 422 detects a flush opportunity or receives a flush command, memory controller 422 may access write buffer status register 424 to determine a status of write buffer 426, and whether a flush operation can be performed at this time.

As described above with reference to FIG. 4, memory system 400 supports prioritized write buffer flush operations to improve throughput of writing to memory device 420, particularly to main storage 428 that is capable of storing multiple bits of data per cell. Such improved throughput may be achieved by selectively or conditionally prioritizing write buffer flush operations based to leverage the improved throughput of write buffer 426 (e.g., a Turbo Write/Write-Booster Buffer) that includes an SLC memory architecture, as compared to the MLC or TLC memory architecture of main storage 428. For example, write buffer 426 may be configured to complete in-progress flush operations when the write buffer is less full and/or when the commands are more numerous or larger. In this manner, the prioritized write buffer flush schemes implemented by memory system 400 may reduce the overall latency to flush the write buffer 426 and write the data. For example, flush operations that are close to completion may not be interrupted by larger write operations, which reduces the likelihood that a write command 442 will be written directly to main storage 428. Reducing the amount of write operations performed directly to main storage 428 improves the throughput of memory system 400.

Referring to FIGS. 5A-5G, FIGS. 5A-5G illustrate example operations of one example of a write buffer flush scheme according to some embodiments of the disclosure. Each figure of FIGS. 5A-5G illustrates an example of operations of one or more components of a memory system, including a write buffer thereof, during a write buffer flush. In FIGS. 5A-5G, a memory system is illustrated, such as the memory system 400 of FIG. 4.

Referring to FIG. 5A, FIG. 5A illustrates example operations of memory components in an idle state. In FIG. 5A, the components of the memory system 400 may be idle or in a hibernation state. For example, the command queue 490 may be empty, the write buffer 426 may be empty (and not actively performing a flush), the main storage 428 may not be writing or reading any data (e.g., writing data from or associated with commands from the command queue or from commands stored in the write buffer 426), a processor may not be receiving data or executing instructions from the main storage 428, or any combination thereof.

Referring to FIG. 5B, FIG. 5B illustrates example operations of the memory components for populating writing commands in a command queue. In FIG. 5B, the components of the memory system 400 may resume or wake-up from an idle or a hibernation state, or some other lower power state. For example, the command queue 490 may be activated and may receive one or more commands (e.g., write command 442 of FIG. 4) from the host device 410 for writing to the main storage 428. As described above, latency and throughput may be improved by utilizing a write buffer (e.g., write boost buffer) to store commands/data for writing to the main storage 428. To illustrate, commands from the command queue may be first transferred or placed in the write buffer 426 before transfer to the main storage 428.

Such a scheme may provide latency and throughput improvements when the main storage 428 utilizes multiple level memory cells. To illustrate, by using cells with lower latency, such as single layers cells, for an intermediate buffer, the overall write process can be improved and processing time may be reduced.

In some implementations, the memory system 400 may resume or wake-up responsive to an activation or wake-up command from the host device 410. For example, the host device 410 may send a wake-up or activation command or may transmit a status query to the memory device 420, such as the write buffer 426 thereof.

Figures 5C, 5D:
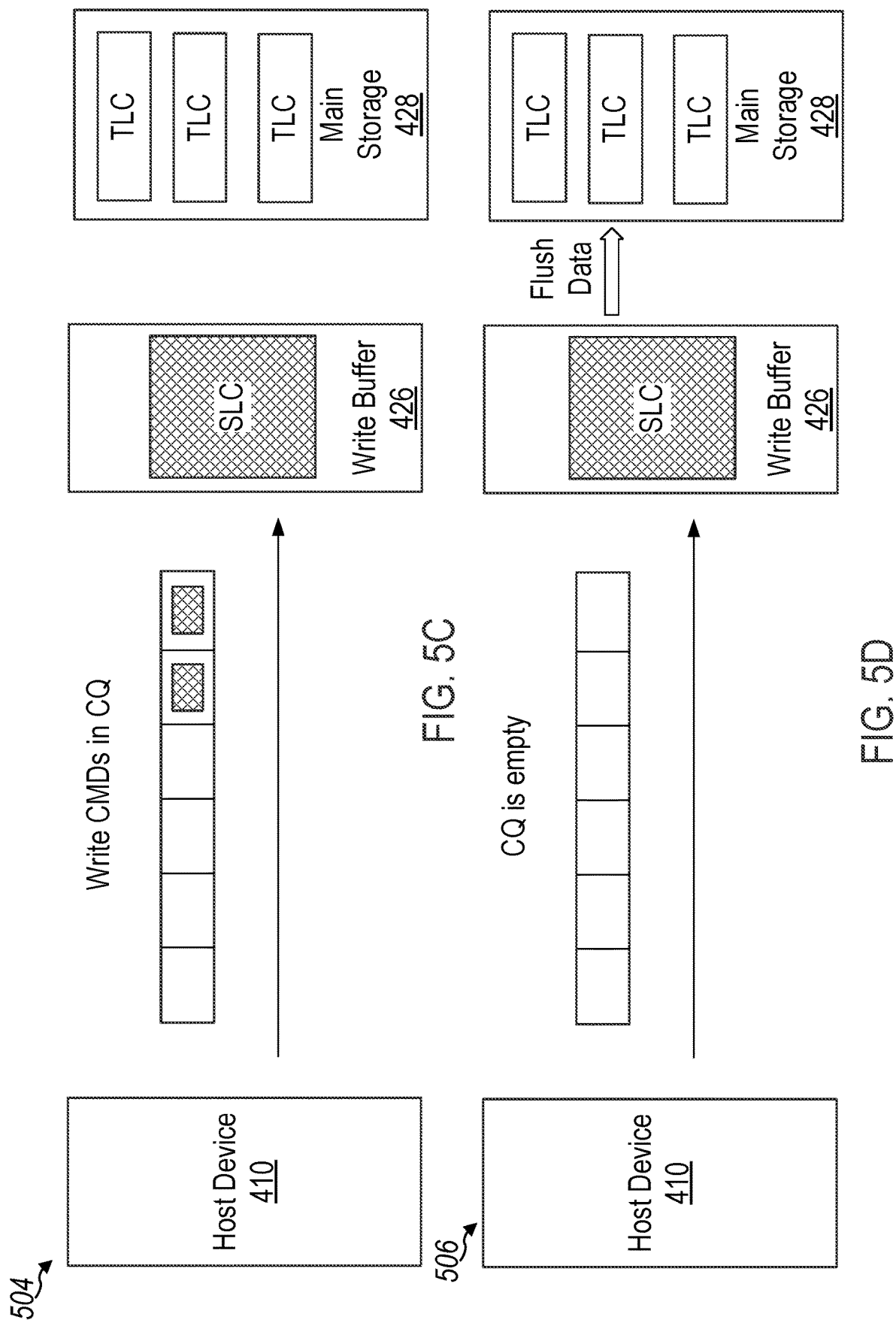

Referring to FIG. 5C, FIG. 5C illustrates example operations of the memory components for writing data in SLC memory. In FIG. 5C, the components of the memory system 400 may perform data write operations. For example, commands from the command queue 490 may be executed to write data to the main storage 428. To illustrate, commands from the command queue 490 may be executed to first write data to the write buffer 426 before transferring the data into (e.g., writing the data into) the main storage 428.

Referring to FIG. 5D, FIG. 5D illustrates example operations of the memory components for starting a write buffer flush when the command queue is empty. In FIG. 5D, the components of the memory system 400 perform a write buffer flush operation. Write buffer flush operations may be performed responsive to one or more conditions or situations, such as responsive to instruction from the host device, responsive to the write buffer 426 being full, responsive to a change in status or indication to change states (e.g., hibernate), etc. In the example of FIG. 5D, the memory device 400 determines to perform a write buffer flush when the commands from the command queue 490 have been executed and the command queue is empty. To perform the write buffer flush, data stored in the write buffer 426 may purged or may be transferred to the main storage 428. For example, data written into the write buffer 426 from executed commands from the command queue 490 may transferred or written into the main storage 428.

Referring to FIG. 5E, FIG. 5E illustrates example operations of the memory components depicting partial progress for the write buffer flush operation. In FIG. 5E, the components of the memory system 400 are in progress of completing the write buffer flush operation. As illustrated in FIG. 5E, in the write buffer 426 flushed data corresponds to white space and data to be flushed corresponds to cross-hatched.

In the example of FIG. 5E, a majority of the data of the write buffer 426 has already been flushed and a minority amount of data is awaiting to be flushed. For example, over half of the data of the write buffer 426 has been flushed or over half of the data in the write buffer 426 has been flushed. To illustrate, over half of the total data in the write buffer 426 has been moved (transferred or written to) the main storage 428.

Referring to FIG. 5F, FIG. 5F illustrates example operations of the memory components when populating writing commands in the command queue during the write buffer flush operation. In FIG. 5F, one or more commands are received or placed into the command queue while the components of the memory system 400 are in progress of completing the write buffer flush operation. As illustrated in FIG. 5F, in the write buffer 426 is not yet completely flushed data, but commands have been received into the command queue.

In such situations, memory systems have historically or conventionally paused the flush operation and execute the command in the command queue to provide better overall system performance and latency. For example, for a data write command in the command queue 490, data is written directly into the main storage 428. As another example, for another type of command, the memory system 400 may perform another action, such as read data from the main storage 428.

Thus, in FIG. 5F the write buffer 426 pauses its flush operation until the command or commands from the command queue 490 are executed. Conventional operation is that flushing is lower priority and data is not flushed when other, potentially higher priority commands are awaiting execution. To illustrate, the write buffer 426 pauses its data transfer or write to the main storage 428 and the commands from the command queue 490 may be executed prior to completion of the in-process write buffer flush of the write buffer 426.

Figure 5G:
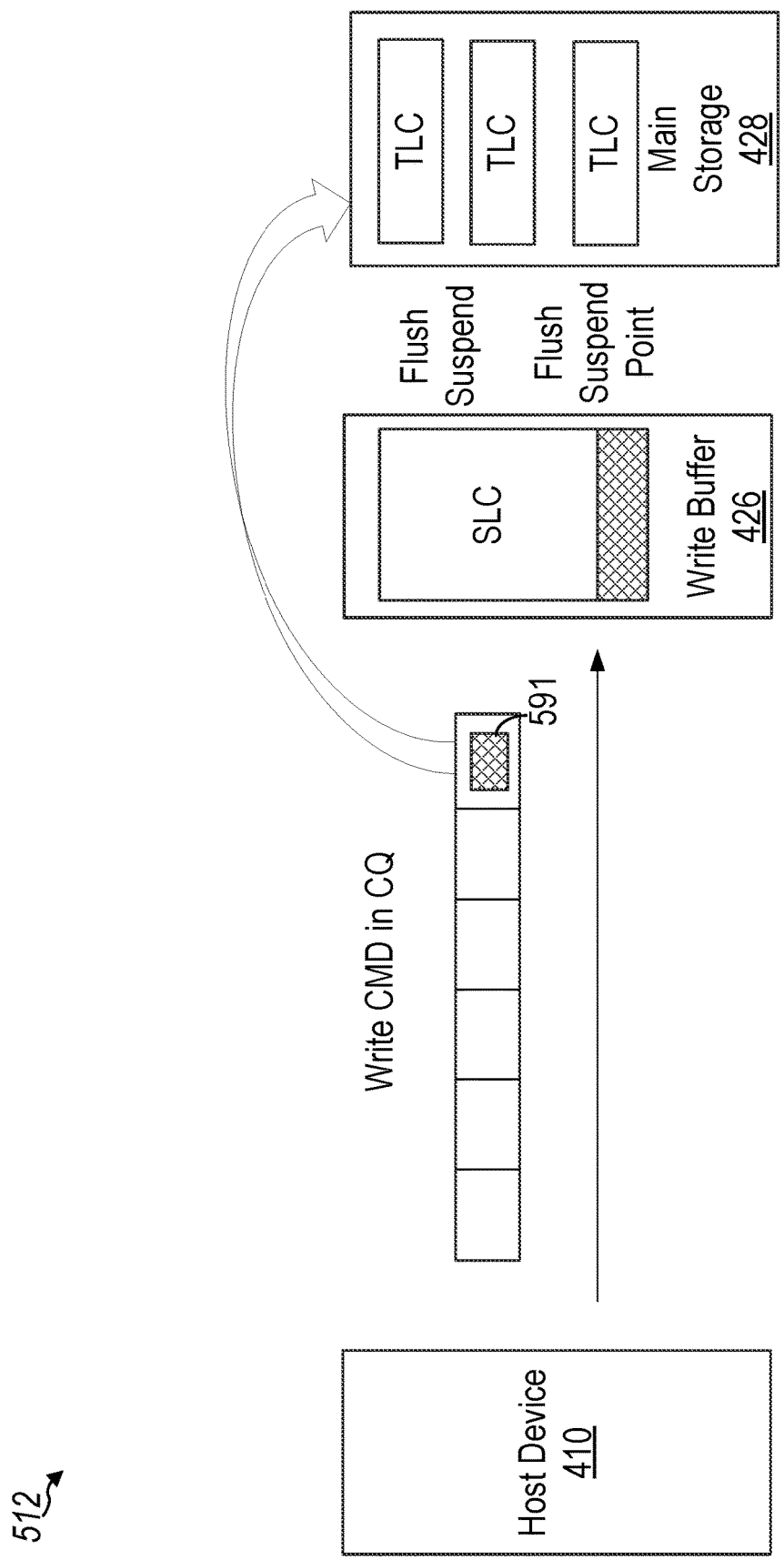

Referring to FIG. 5G, FIG. 5G illustrates example operations of the memory components for suspending the write buffer flush when the command queue is not empty. In FIG. 5G, after or in connection with the command 591 being placed into the command queue 490, the memory system 400 may suspend the write buffer flush operation. For example, the write buffer 426 may still have data in the write buffer 426 (as illustrated by the cross-hatched section) which still needs to be flushed, and the memory system 400 may instead execute the command 591 prior to emptying the write buffer 426. To illustrate, the command 591 may be removed from the command queue 490 to be executed. In some implementations, the command 591 is moved from the command queue 490 to the main storage 428. As the main storage 428 may have a different type of memory, TLC, then the write buffer 426, SLC, the performance of the overall memory system to move the command 591 from the command queue 490 may be slower. However, because the write buffer 426 was not yet empty, executing and/or moving the command 591 from the command queue 490 without placement in the write buffer 426 may still be faster than completing the flush of the write buffer 426 and then moving the command 591 to the write buffer 426 for execution.

Notwithstanding the improvement in latency in some situations, such as when the write buffer is more full, there may be some situations in which there may be less latency and/or overall better performance of the entire system to first finish the write buffer flush and to utilize the write buffer 426 for commands placed in the command queue 490 during a write buffer flush. For example, when the write buffer has lower levels of data to be flushed, the performance of the system may be improved and the latency may be reduced by finishing (prioritizing) the write buffer flush (e.g., executing the commands in the command queue, such as by writing data to or reading data from the main storage 428) and then utilizing the improved latency of the write buffer, such as the SLCs thereof, to write data to the main storage 428.

To illustrate, the write buffer 426 pauses its data transfer or write to the main storage 428 (e.g., TLCs) from its cells (e.g., SLCs) and data from or associated with executing the commands from the command queue may be written directly into the main storage 428 (e.g., TLCs thereof).

Figure 6C:
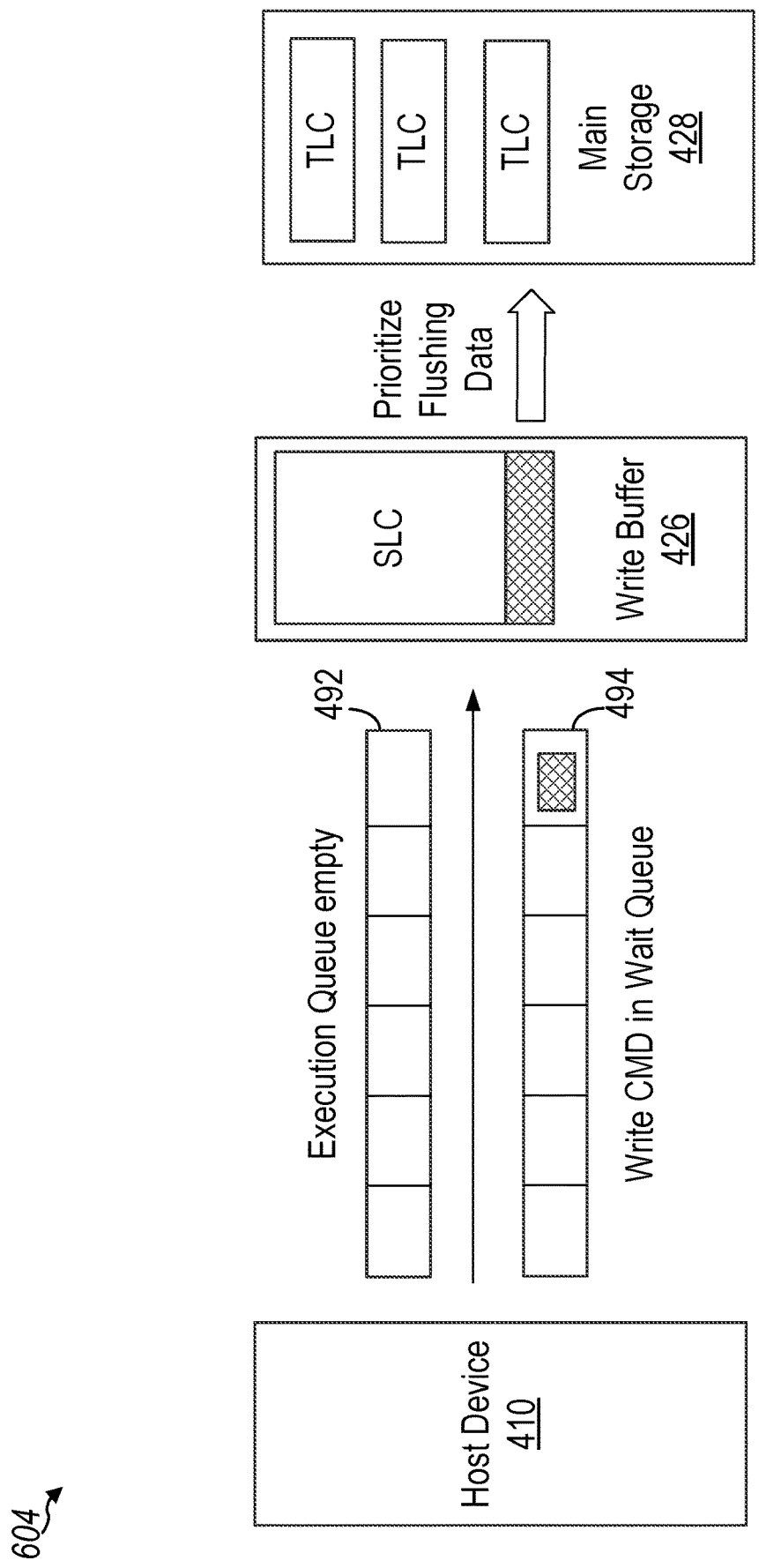

Referring to FIGS. 6A-6C, FIGS. 6A-6C illustrate example operations of an example of a prioritized write buffer flush scheme according to some embodiments of the disclosure. Each figure of FIGS. 6A-6C illustrates an example of operations of one or more components of a memory system including a write buffer thereof. The operations shown in FIGS. 6A-6C may occur after or in place of some of the operations or steps shown in FIGS. 5A-5G. For example, the operations of FIGS. 6A-6C may occur after and in place of the operations of FIGS. 5E-5G.

Referring to FIG. 6A, FIG. 6A illustrates example operations of the memory components depicting partial progress for the write buffer flush operation, similar to FIG. 5E. In FIG. 6A, the components of the memory system 400 are in progress of completing the write buffer flush operation. As illustrated in FIG. 6A, in the write buffer 426 is not yet completely flushed data and the memory system 400 may be in a similar situation as shown and described with reference to FIG. 5E. The write buffer flush operation may be initiated by any of the flush operation triggering conditions described herein, such as with reference to FIGS. 5D and 5E.

In the example illustrated in FIG. 6A, a majority of the data of the write buffer 426 has already been flushed and a minority amount of data is awaiting to be flushed. For example, over half of the data of the write buffer 426 has been flushed or over half of the data in the write buffer 426 has been flushed. To illustrate, over half of the total data in the write buffer 426 has been moved (transferred or written to) the main storage 428.

Referring to FIG. 6B, FIG. 6B illustrates example operations of the memory components when populating writing commands in the command queue during the write buffer flush operation, similar to FIG. 5F.

In FIG. 6B, one or more commands are received or placed into the command queue while the components of the memory system 400 are in progress of completing the write buffer flush operation. As illustrated in FIG. 6B, in the write buffer 426 is not yet completely flushed data, but commands have been received into the command queue, and the memory system 400 may be in a similar situation as shown and described with reference to FIG. 5F.

In the aspects described herein the memory system 400 may determine whether or not to continue the flush operation and prioritize the flush operation over other received commands. For example, the memory system 400 may determine whether to prioritize finishing the flush operation before executing commands received into the command queue 490 after starting and during performance of the write buffer flush operation.

The memory system 400 may perform one or more determinations to determine whether the flush operation should be prioritized over the incoming command or commands, such as command 591, received in the command queue 490. In some implementations, the one or more determination may be performed by the host device 410, the memory device 420, or a combination thereof. By prioritizing the flush operations in some circumstances or situations, performance of the memory system may be improved, such as when the flush operation is almost complete.

Referring to FIG. 6C, FIG. 6C illustrates example operations of the memory components for prioritizing the write buffer flush operation. As compared to the operations depicted in FIG. 5G, the operations shown in FIG. 6C illustrate that the flush operation is prioritized and the command in the command queue is moved from the command queue (e.g., execution queue or command execution queue) to a second command queue, such as a wait queue or command wait queue. In the example illustrated in FIG. 6C, commands are moved from the execution queue 492 to the wait queue 494.

Although the wait queue 494 is illustrated as a separate queue from the execution queue 492, the execution queue 492 and the wait queue 494 may each correspond to a distinct portion of the command queue 490 or a portion of the logic associated with the command queue 490. For example, the memory system 400 may partition the physical components and/or logic for the command queue 490 into two logical queues of the execution queue 492 and the wait queue 494. Such a solution may enable flush prioritization operations to be implemented without a hardware change and/or with minimal change to memory specifications or standards.

Alternatively, in other implementations, the memory system 400 may utilize a single queue, such as command queue 490. In such implementations, the memory system 400 may adjust settings or execution priority to conditionally give execution priority to the flush operation and may not automatically prioritize commands in the command queue 490. Accordingly, the flush operations can be prioritized over one or more commands in the command queue 490, or over certain type of commands in the command queue 490.

Although the operations shown in FIG. 6C illustrate placing commands into a second separate queue, the commands to be placed into the command queue 490 or execution queue 492 may be otherwise held or deprioritized in favor of the flush operation. The specific example of moving the commands to a separate queue to enable waiting to execute the commands after the flush operation is completed is just one example which may enable legacy systems that are programmed to prioritize commands in the command queue 490 over flush operations.

Figure 7:
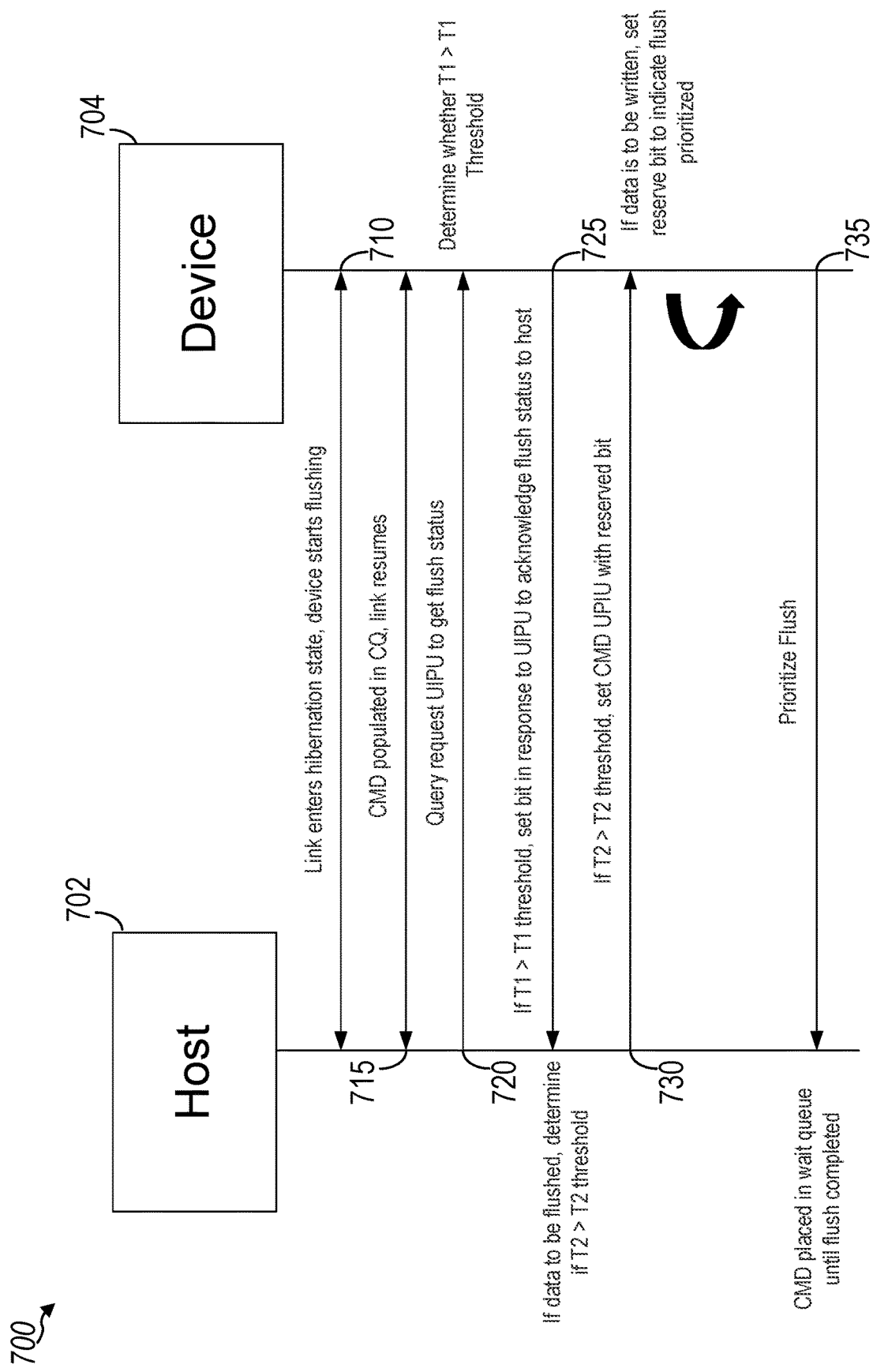
FIG. 7 is a flow diagram illustrating operations for an enhanced prioritized write buffer flush scheme according to some embodiments of the disclosure.

FIG. 7 is a flow diagram 700 illustrating operations for an enhanced write buffer flush scheme for prioritizing a write buffer flush operation according to some embodiments of the disclosure. In FIG. 7, a host 702 and a device 704 are illustrated and perform the operations depicted. The host 702 may include or correspond to host 410 of FIG. 4, and device 704 may include or correspond to memory device 420 of FIG. 4. In some implementations, the operations may be performed by controller 130 of memory system 110 of FIG. 1, storage system 250 of FIG. 2, memory system 110 of FIG. 3, host 410 or memory controller 422 of memory device 420 of FIG. 4. The operations include, at 710, entering, by the host 702, the device 704, or both, a hibernation state. For example, the device 704 may detect a flush opportunity by detecting receipt, by the memory device, of a flush command from the host 702 or by detecting that an interface that couples the memory device to the host device is dormant.

At 715, a command is populated in a command queue and the link resumes. For example, the host 702 may transmit a command to the device 704 and the device 704 may place or populate the command into the command buffer, or cause the command to be placed into a command buffer, as described with reference to FIGS. 4-6C.

At 720, the host 702 transmits a query request to get a flush status. For example, the host 702 transmits a UIPU query request to get a status of the instructed flush or to inquire if a flush associated with entering a hibernation or dormant state is completed or in progress. Responsive to the query request, the device 704 may determine a status of an in-progress flush operation or if a flush operation has been initiated or been completed. For example, the device 704 may determine a flush status based on an amount of data to be flushed from a total write buffer (TWB) size. To illustrate, the device 704 may determine a flush status based on a parameter T1 (e.g., amount of data in the write buffer) satisfying a corresponding buffer status condition, such as being less than or equal to a threshold amount (e.g., a T1 threshold amount). In a particular implementation, the parameter T1 (data to be flushed parameter) is equal to amount of data to be flushed from the write buffer and the T1 condition is determining whether a percentage of the amount of data to be flushed from the write buffer of a total size (amount of data capacity) of the write buffer (TWB) is less than or equal to a threshold percentage.

The T1 threshold amount (e.g., a first prioritized flush condition or a data to be flushed condition) may be preconfigured, semi-static, or configurable. As an illustrative, non-limiting example, the threshold is 10 percent of the data in the write buffer for a main memory with a TLC architecture and a write buffer with a SLC architecture and a particular latency difference. However, the threshold may have higher or lower values, such as 5-25 percent, depending on the system, such as based on the latency difference between the write buffer and memory and based on the write buffer size. For example, the threshold may be lower or adjusted downwards for devices where the write buffer experiences performance degradation or the main memory has less of a latency difference from the write buffer (e.g., 10). As another example, the threshold may be higher or adjusted upwards for devices where the main memory experiences performance degradation or the main memory has a greater latency difference from the write buffer (e.g., TLC or higher level cells). Additionally, larger buffers may also use lower thresholds.

In some implementations when the threshold is adjusted or configurable, a default threshold will be set, such as 10 percent, and an adjustment or device specific value may be set or configured. To illustrate, the T1 threshold may be X–Y % of the TWB. To illustrate, X may be 10 percent and represent the data to be flushed threshold and Y may be a value of −3 percent to 3 percent and represent a device specific adjustment threshold value for the data to be flushed threshold.

If the condition is satisfied, at 725, the device 704 transmits a response to the host 702 indicating the buffer status. For example, the device 704 transmits a response to the UIPU to the host 702 to indicate a flush status. To illustrate, the device 704 sets a reserve bit to a particular value to acknowledge a flush status to the host 702.

Responsive to the buffer status response or acknowledgement by the device 704, the host 702 may determine whether the device 704 is flushing data or has data to be flushed. If the host 702 determines that the device 704 has data to be flushed, such as the device 704 is in process of a buffer flush operation, at 730, the host 702 determines if a total write parameter condition is satisfied. For example, the host 702 may determine if a total amount of write requests in the command queue satisfies a condition related to the TWB size. To illustrate, the determine if a parameter T2 (e.g., a total amount of write requests in the command queue) satisfies a threshold of a portion of the TWB size (e.g., greater than or equal to a T2 threshold). In a particular implementation, T2 is equal to amount of data to be written from the command queue and the T2 condition is determining whether a percentage of the amount of data to be written from the command queue of a total size (amount of data capacity) of the write buffer (TWB) is greater than or equal to a threshold percentage.

The second threshold amount (e.g., second prioritized flush condition or data to be written condition) may be pre-configured, semi-static, or configurable. As an illustrative, non-limiting example, the second threshold is 75 percent of the total write buffer size (TWB) for a main memory with a TLC architecture and a write buffer with a SLC architecture and a particular latency difference. However, the threshold may include higher or lower values, such as 50-90 percent, depending on the latency difference between the write buffer and memory and based on write buffer size. For example, the second threshold may be higher or adjust upwards for devices where the write buffer experiences performance degradation or the main memory has less of a latency difference from the write buffer (e.g., 75 percent). As another example, the second threshold may be lower or adjusted downwards for devices where the main memory experiences performance degradation or the main memory has a greater latency difference from the write buffer (e.g., TLC or higher level cells). Additionally, larger buffers may also use higher thresholds.

In some implementations when the second threshold is adjusted or configurable, a default threshold will be set, such as 75 percent, and an adjustment or device specific value may be set or configured. To illustrate, the T2 threshold may be X–Y % of the TWB. To illustrate, X may be 75 percent and represent the data to be written threshold and Y may be −15 percent to 15 percent and represent a device specific adjustment threshold value for the data to be written threshold.

At 730, when the host 702 determines the T2 parameter is satisfied, the host 702 sets a command UIPU reserve bit to a value to indicate data is to be written to the command queue, and optionally that a flush is to be prioritized. Responsive to the command UIPU, the device determines whether to prioritize the flush operation. For example, the device 704 may prioritize the flush based on a value of the reserve bit set by the host 702. To illustrate, the device 704 may interpret the value of the reserve bit to indicate a command is to be written and to prioritize a flush, or may interpret the value of the reserve bit to indicate a command is to be written and may determine to prioritize the flush based on pre-configuration or an evaluation of an additional condition.

At 735, the device 704 prioritizes the flush operation. For example, the device 704 places the command into the wait queue until the flush is completed based on the value of the reserve bit and optionally one or more other conditions. To illustrate, the device 704 places a received command directly into the wait queue until the flush is completed and then transfers the command to the command queue. As another illustration, the device 704 transfers the command from the command queue to the wait queue until the flush is completed, and then the device 704 transfers the command to the command queue.

Figure 8:
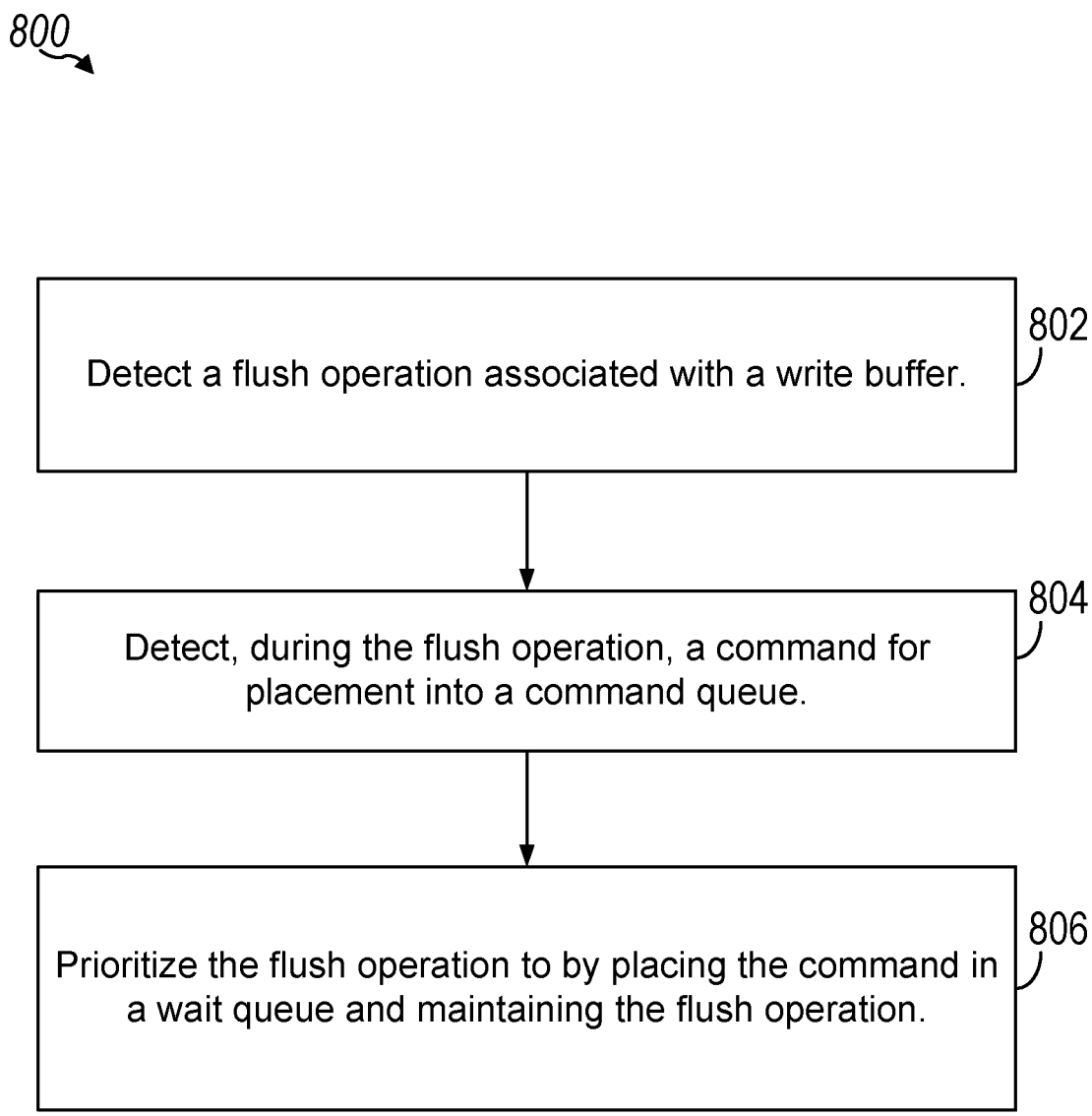
FIG. 8 is a flow chart illustrating a method for an enhanced prioritized write buffer flush scheme according to some embodiments of the disclosure.

FIG. 8 is a flow chart illustrating a method for an enhanced write buffer flush scheme for prioritizing a write buffer flush operation according to some embodiments of the disclosure. In some implementations, the method may be performed by host device 102 or controller 130 of memory system 110 of FIG. 1, memory 220, application processor 230, or storage system 250 of FIG. 2, host device 102 or memory system 110 of FIG. 3, host device 410 or memory controller 422 of memory device 420 of FIGS. 4-6C, host or 702 or device 704 of FIG. 7.

A method 800 includes, at block 802, detecting a flush operation associated with a write buffer. The flush operation may include or correspond to a flush operation as described with reference to any of FIGS. 4-7. The write buffer may include or correspond to write buffer 426 of FIGS. 4-6C, such as a buffer with SLC or a lower level memory cell than its corresponding main storage, such as main storage 428 of FIG. 4. For example, the memory controller 422 of the memory device 420 or the device 704 determines that the write buffer 426 is performing a flush operation or has been scheduled, signaled, or other triggered to perform a flush operation, as described with reference to FIGS. 4-7. As another example, the host device 410 or the host 702 determines that the write buffer 426 is performing a flush operation or has been scheduled, signaled, or other triggered to perform a flush operation, as described with reference to FIGS. 4-7.

The method 800 also includes, at block 804, detecting, during the flush operation, a command for placement into a command queue. The command may include or correspond to command of FIG. 4. The commands may include write commands, read commands, or other task commands, such as hibernate, reset, power-off, etc. The command queue may include or correspond to command queue 490 of FIGS. 4-6C. For example, the memory controller 422 of the memory device 420 determines that the command 591 has been placed into command queue 490, that the command 591 has been received from the host device 410, or the host device 410 has new commands to send or awaiting execution, as described with reference to FIGS. 4-7. As another example, the host device 410 or the host 702 determines that the command 591 has been placed into command queue 490, that the command 591 has been received by the host device 410, or the host device 410 has new commands to send or awaiting execution, as described with reference to FIGS. 4-7.

The method 800 further includes, at block 806, prioritizing, the flush operation to by placing the command in a wait queue and maintaining the flush operation. The wait queue may include or correspond to wait queue 494 of FIGS. 4 and 6C. The wait queue may include or correspond to a portion of the command queue 490 (e.g., same physical components or logic) and may be a logical partition thereof, or alternatively the wait queue may correspond to separate physical components from the command queue 490. Prioritizing the flush operation may include moving commands from the command queue to the wait queue, placing commands scheduled or intended in the command queue temporarily in the wait queue (e.g., during the in-progress flush operation), or a combination thereof. For example, the memory controller 422 of the memory device 420 may cause the command 591 to be moved from the command queue 490 (or execution queue 492 thereof) to the wait queue 494, or may cause received commands, such as the command 591, to be placed directly into the wait queue 494, as described with reference to FIGS. 6C and 7. Additionally, the memory controller may finish the flush operation by writing the remaining data in the write buffer to the memory module and unmapping the write buffer, as described with reference to FIGS. 6C and 7. As another example, the host device 410 or the host 702 may move the command 591 from the command queue 490 (or execution queue 492 thereof) to the wait queue 494, or may place received commands, such as the command 591, directly into the wait queue 494, as described with reference to FIGS. 6C and 7.

Operations of flow diagram 700 or method 800 may be performed by a user equipment (UE). For example, example operations (also referred to as "blocks") of method 700 or method 800 may enable a UE (e.g., a wireless communication device) to support an enhanced write buffer flush scheme for prioritized buffer flush operations, including utilizing a wait buffer and continuing buffer flush operations even when commands are waiting or set for a command queue.

In a first aspect, an apparatus includes a memory controller: coupled to a write buffer and configured to access data stored at the write buffer, the write buffer having a single-level cell (SLC) memory architecture; coupled to a memory module through a first channel and configured to access data stored at the memory module through the first channel, the memory module having a higher storage density memory architecture than the write buffer; and coupled to a host device through a first interface and configured to communicate with the host device over the first interface, the memory controller configured to cause the apparatus to: detect a flush operation associated with the write buffer; detect, during the flush operation, a command for placement into a command queue associated with the host device; and prioritize the flush operation by causing the host device to place the command in a wait queue and maintaining the flush operation.

In a second aspect, alone or in combination with the first aspect, the memory controller configured to cause the apparatus to detect the flush operation includes to: transmit, by the memory controller, a data to be flushed indicator.

In a third aspect, alone or in combination with one or more of the above aspects, the memory controller configured to cause the apparatus to detect the flush operation includes to: receive, by the memory controller, a request to flush data.

In a fourth aspect, alone or in combination with one or more of the above aspects, the write buffer includes a plurality of single-level cells (SLCs) and wherein the memory includes a plurality of multiple-level cells (MLCs).

In a fifth aspect, alone or in combination with one or more of the above aspects, the MLCs include triple-level cells (TLCs).

In a sixth aspect, alone or in combination with one or more of the above aspects, the memory controller is further configured to cause the apparatus to: enter, prior to detection of the flush operation, a hibernation state, wherein the apparatus begins the flush operation responsive to entering the hibernation state.

In a seventh aspect, alone or in combination with one or more of the above aspects, the memory controller is further configured to cause the apparatus to: receive, by the memory controller, a query request to get flush status information; determine whether an amount of data to be flushed satisfies a prioritized flush condition; and transmit, by the memory controller, a data to be flushed indication based on the amount of data to be flushed satisfying the prioritized flush condition.

In an eighth aspect, alone or in combination with one or more of the above aspects, the memory controller configured to cause the apparatus to determine whether the amount of data to be flushed satisfies the prioritized flush condition includes to: determine whether a remaining amount of data to be flushed of the write buffer exceeds a threshold value; or determine whether a percentage of the remaining amount of data to be flushed of a total size of the write buffer exceeds a threshold percentage.

In a ninth aspect, alone or in combination with one or more of the above aspects, the memory controller is further configured to cause the apparatus to: transmit a second query request; receive a response to a second query request, wherein the response does not include a data to be flushed indication; and cause the host device to place additional commands in the command queue.

In a tenth aspect, alone or in combination with one or more of the above aspects, the memory controller is further configured to cause the apparatus to: receive a data to be written indication; transmit an indication that the flush operation is being prioritized; and write the remaining data in the write buffer to the memory and unmap the write buffer.

In an eleventh aspect, alone or in combination with one or more of the above aspects, the memory controller configured to cause the apparatus to prioritize the flush operation includes to: write data stored in the write buffer to the memory before executing any commands in the command queue.

In a twelfth aspect, alone or in combination with one or more of the above aspects, the memory controller is further configured to cause the apparatus to: adjust a write buffer flush prioritization condition based on memory cell latency, memory cell degradation, a size of the write buffer, a performance mode, a power setting, or a combination thereof.

In a thirteenth aspect, alone or in combination with one or more of the above aspects, the memory controller is further configured to cause the apparatus to: detect, prior to the detection of the command and after detection of the flush operation, a second command for placement into the command queue for the write buffer; and pause the flush operation responsive to a determination to not prioritize the flush operation; execute the second command; and resume the flush operation after execution of the second command.

In a fourteenth aspect, alone or in combination with one or more of the above aspects, the memory controller is further configured to cause the apparatus to: determine to not prioritize the flush operation over the second command based on the determination that an amount of data to be flushed is greater than or equal to a threshold amount; and determine to not prioritize the flush operation over the second command based further on indication from the host device for a second determination by the host device that an amount data associated with a total amount of write requests in the command queue is less than or equal to a second threshold amount.

In a fifteenth aspect, alone or in combination with one or more of the above aspects, the memory controller is further configured to cause the apparatus to: detect a second flush operation associated with the write buffer; detect, during the second flush operation, a second command for placement into the command queue for the write buffer; and pause the second flush operation responsive to a determination to not prioritize the second flush operation; execute the second command; and complete the second flush operation after execution of the second command.

In a sixteenth aspect, alone or in combination with one or more of the above aspects, the memory controller is further configured to cause the apparatus to: complete the flush operation; and instruct the host device to move the commands from the wait queue to the command queue and execute the commands responsive to completion of the flush operation.

In a seventeenth aspect, alone or in combination with one or more of the above aspects, an apparatus includes a host device coupled to a memory controller through a first interface and configured to communicate with the memory controller over the first interface, the host device configured to cause the apparatus to: detect a flush operation associated with a write buffer; detect, during the flush operation, a command for placement into a command queue; and prioritize the flush operation by placing the command in a wait queue and not interrupting the flush operation.

In an eighteenth aspect, alone or in combination with one or more of the above aspects, the host device configured to cause the apparatus to detect the flush operation includes to: receive a data to be flushed indicator.

In a nineteenth aspect, alone or in combination with one or more of the above aspects, the host device configured to cause the apparatus to detect the flush operation includes to: transmit a flush status query request; and receive a flush indicator responsive to the flush status query request.

In a twentieth aspect, alone or in combination with one or more of the above aspects, the command queue includes an execution queue and the wait queue, and wherein the command is placed in the execution queue.

In a twenty-first aspect, alone or in combination with one or more of the above aspects, the host device configured to cause the apparatus to prioritize the flush operation includes to: refrain from placing the command in the command queue.

In a twenty-second aspect, alone or in combination with one or more of the above aspects, the wait queue is separate from the command queue.

In a twenty-third aspect, alone or in combination with one or more of the above aspects, the host device is further configured to cause the apparatus to: place, prior to prioritization of the flush operation, the command in the command queue; and resume from a hibernation state responsive to placement of the command in the command queue, wherein the command is moved from the command queue to the wait queue after a determination that the flush operation is to be prioritized over execution of the command.

In a twenty-fourth aspect, alone or in combination with one or more of the above aspects, the host device is further configured to cause the apparatus to: transmit a query request to get flush status information.

In a twenty-fifth aspect, alone or in combination with one or more of the above aspects, the host device is further configured to cause the apparatus to: receive a response to the query request including a data to be flushed indication; determine whether an amount of write requests satisfies a second prioritized flush condition; and transmit data to be written indication based on the amount of write requests satisfying the second prioritized flush request condition.

In a twenty-sixth aspect, alone or in combination with one or more of the above aspects, the host device configured to cause the apparatus to determine whether the amount of write requests satisfies the second prioritized flush request condition includes: determine whether an amount of write requests exceeds a threshold value; or determine whether a percentage of an amount of data associated with the write requests of a total size of the write buffer exceeds a threshold percentage.

In a twenty-seventh aspect, alone or in combination with one or more of the above aspects, the host device is further configured to cause the apparatus to: receive an indication that the flush operation is being prioritized; and place one or more commands in a wait queue until the flush operation is complete.

In a twenty-eighth aspect, alone or in combination with one or more of the above aspects, the host device is further configured to cause the apparatus to: receive an indication that the flush operation is being prioritized; and refrain from placing one or more commands in the command queue until the flush operation is complete.

In a twenty-ninth aspect, alone or in combination with one or more of the above aspects, a method includes: detecting, by a memory controller, a flush operation associated with a write buffer; detecting, by the memory controller during the flush operation, a command for placement into a command queue for the write buffer; and prioritizing, by the memory controller, the flush operation by causing the command to be placed in a wait queue and maintaining the flush operation.

In a thirtieth aspect, alone or in combination with one or more of the above aspects, A method comprising: detecting, by a host device, a flush operation associated with a write buffer; detecting, by the host device during the flush operation, a command for placement into a command queue for the write buffer; and prioritizing, by the host device, the flush operation by placing the command in a wait queue and not interrupting the flush operation.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 1-5 and 8 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIG. 4 or 5. Additionally, or alternatively, one or more operations described above with reference to FIGS. 1-3 may be combined with one or more operations described with reference to FIG. 4-5 or 8. Additionally, or alternatively, one or more operations of methods described herein may be performed in a different order than described. For example, operations of method 600 of FIG. 6 or flow diagram 700 of FIG. 7 may be performed out of order or in a different order than shown in FIGS. 6-7.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD- ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
a memory controller:
coupled to a write buffer and configured to access data stored at the write buffer, the write buffer having a single-level cell (SLC) memory architecture;
coupled to a memory module through a first channel and configured to access data stored at the memory module through the first channel, the memory module having a higher storage density memory architecture than the write buffer; and
coupled to a host device through a first interface and configured to communicate with the host device over the first interface,
the memory controller configured to cause the apparatus to:
detect a flush operation associated with the write buffer;
detect, during the flush operation, a command for placement into a command queue associated with the host device; and
prioritize the flush operation by causing the host device to place the command in a wait queue and maintaining the flush operation.

2. The apparatus of claim 1, wherein the memory controller configured to cause the apparatus to detect the flush operation includes to:
transmit, by the memory controller, a data to be flushed indicator.

3. The apparatus of claim 1, wherein the memory controller configured to cause the apparatus to detect the flush operation includes to:
receive, by the memory controller, a request to flush data.

4. The apparatus of claim 1, wherein the write buffer includes a plurality of single-level cells (SLCs) and wherein the memory module includes a plurality of multiple-level cells (MLCs).

5. The apparatus of claim 4, wherein the MLCs include triple-level cells (TLCs).

6. The apparatus of claim 1, wherein the memory controller is further configured to cause the apparatus to:
enter, prior to detection of the flush operation, a hibernation state, wherein the apparatus begins the flush operation responsive to entering the hibernation state.

7. The apparatus of claim 1, wherein the memory controller is further configured to cause the apparatus to:
receive, by the memory controller, a query request to get flush status information;
determine whether an amount of data to be flushed satisfies a prioritized flush condition; and
transmit, by the memory controller, a data to be flushed indication based on the amount of data to be flushed satisfying the prioritized flush condition.

8. The apparatus of claim 7, wherein the memory controller configured to cause the apparatus to determine whether the amount of data to be flushed satisfies the prioritized flush condition includes to:
determine whether a remaining amount of data to be flushed of the write buffer exceeds a threshold value; or
determine whether a percentage of the remaining amount of data to be flushed of a total size of the write buffer exceeds a threshold percentage.

9. The apparatus of claim 1, wherein the memory controller is further configured to cause the apparatus to:
transmit a second query request;
receive a response to a second query request, wherein the response does not include a data to be flushed indication; and
cause the host device to place additional commands in the command queue.

10. The apparatus of claim 1, wherein the memory controller is further configured to cause the apparatus to:
receive a data to be written indication;
transmit an indication that the flush operation is being prioritized; and
write the data in the write buffer to the memory and unmap the write buffer.

11. The apparatus of claim 1, wherein the memory controller configured to cause the apparatus to prioritize the flush operation includes to:
write data stored in the write buffer to the memory before executing any commands in the command queue.

12. The apparatus of claim 1, wherein the memory controller is further configured to cause the apparatus to:
adjust a write buffer flush prioritization condition based on memory cell latency, memory cell degradation, a size of the write buffer, a performance mode, a power setting, or a combination thereof.

13. The apparatus of claim 1, wherein the memory controller is further configured to cause the apparatus to:
detect, prior to the detection of the command and after detection of the flush operation, a second command for placement into the command queue for the write buffer; and
pause the flush operation responsive to a determination to not prioritize the flush operation;
execute the second command; and
resume the flush operation after execution of the second command.

14. The apparatus of claim 13, wherein the memory controller is further configured to cause the apparatus to:
determine to not prioritize the flush operation over the second command based on the determination that an amount of data to be flushed is greater than or equal to a threshold amount; and
determine to not prioritize the flush operation over the second command based further on indication from the host device for a second determination by the host device that an amount data associated with a total amount of write requests in the command queue is less than or equal to a second threshold amount.

15. The apparatus of claim 1, wherein the memory controller is further configured to cause the apparatus to:
detect a second flush operation associated with the write buffer;
detect, during the second flush operation, a second command for placement into the command queue for the write buffer; and
pause the second flush operation responsive to a determination to not prioritize the second flush operation;
execute the second command; and
complete the second flush operation after execution of the second command.

16. The apparatus of claim 1, wherein the memory controller is further configured to cause the apparatus to:
complete the flush operation; and
instruct the host device to move the command from the wait queue to the command queue and execute the command responsive to completion of the flush operation.

17. An apparatus, comprising:
a host device coupled to a memory controller through a first interface and configured to communicate with the memory controller over the first interface, the host device configured to cause the apparatus to:
detect a flush operation associated with a write buffer;
detect, during the flush operation, a command for placement into a command queue; and
prioritize the flush operation by placing the command in a wait queue and not interrupting the flush operation.

18. The apparatus of claim 17, wherein the host device configured to cause the apparatus to detect the flush operation includes to:
receive a data to be flushed indicator.

19. The apparatus of claim 17, wherein the host device configured to cause the apparatus to detect the flush operation includes to:
transmit a flush status query request; and
receive a flush indicator responsive to the flush status query request.

20. The apparatus of claim 17, wherein the command queue includes an execution queue and the wait queue, and wherein the command is placed in the execution queue.

21. The apparatus of claim 17, wherein the host device configured to cause the apparatus to prioritize the flush operation includes to:
refrain from placing the command in the command queue.

22. The apparatus of claim 21, wherein the wait queue is separate from the command queue.

23. The apparatus of claim 22, wherein the host device is further configured to cause the apparatus to:
place, prior to prioritization of the flush operation, the command in the command queue; and
resume from a hibernation state responsive to placement of the command in the command queue, wherein the command is moved from the command queue to the wait queue after a determination that the flush operation is to be prioritized over execution of the command.

24. The apparatus of claim 17, wherein the host device is further configured to cause the apparatus to:
transmit a query request to get flush status information.

25. The apparatus of claim 24, wherein the host device is further configured to cause the apparatus to:
receive a response to the query request including a data to be flushed indication;
determine whether an amount of write requests satisfies a second prioritized flush condition; and
transmit data to be written indication based on the amount of write requests satisfying the second prioritized flush request condition.

26. The apparatus of claim 25, wherein the host device configured to cause the apparatus to determine whether the amount of write requests satisfies the second prioritized flush request condition includes:
determine whether an amount of write requests exceeds a threshold value; or
determine whether a percentage of an amount of data associated with the write requests of a total size of the write buffer exceeds a threshold percentage.

27. The apparatus of claim 17, wherein the host device is further configured to cause the apparatus to:
receive an indication that the flush operation is being prioritized; and
place one or more commands in a wait queue until the flush operation is complete.

28. The apparatus of claim 17, wherein the host device is further configured to cause the apparatus to:
receive an indication that the flush operation is being prioritized; and
refrain from placing one or more commands in the command queue until the flush operation is complete.

29. A method comprising:
detecting, by a memory controller, a flush operation associated with a write buffer;
detecting, by the memory controller during the flush operation, a command for placement into a command queue for the write buffer; and
prioritizing, by the memory controller, the flush operation by causing the command to be placed in a wait queue and maintaining the flush operation.

30. A method comprising:
detecting, by a host device, a flush operation associated with a write buffer;
detecting, by the host device during the flush operation, a command for placement into a command queue for the write buffer; and
prioritizing, by the host device, the flush operation by placing the command in a wait queue and not interrupting the flush operation.

* * * * *